(12) United States Patent
Jin et al.

(10) Patent No.: US 12,100,863 B2
(45) Date of Patent: Sep. 24, 2024

(54) ICB ASSEMBLY, BATTERY MODULE COMPRISING THE SAME AND METHOD FOR FABRICATING THE BATTERY MODULE

(71) Applicant: LG Chem, Ltd., Seoul (KR)

(72) Inventors: Hee-Jun Jin, Daejeon (KR); Dal-Mo Kang, Daejeon (KR); Kyung-Mo Kim, Daejeon (KR); Seung-Joon Kim, Daejeon (KR); Jin-Yong Park, Daejeon (KR); Ho-June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 862 days.

(21) Appl. No.: 17/258,850

(22) PCT Filed: Sep. 4, 2019

(86) PCT No.: PCT/KR2019/011423
§ 371 (c)(1),
(2) Date: Jan. 8, 2021

(87) PCT Pub. No.: WO2020/055037
PCT Pub. Date: Mar. 19, 2020

(65) Prior Publication Data
US 2021/0273302 A1    Sep. 2, 2021

(30) Foreign Application Priority Data
Sep. 10, 2018 (KR) .................. 10-2018-0107985

(51) Int. Cl.
*H01M 50/519* (2021.01)
*H01M 10/42* (2006.01)
(Continued)

(52) U.S. Cl.
CPC ....... *H01M 50/519* (2021.01); *H01M 10/425* (2013.01); *H01M 50/211* (2021.01);
(Continued)

(58) Field of Classification Search
CPC .. H01M 50/519; H01M 50/50; H01M 50/516; H01M 50/211; H01M 50/509;
(Continued)

(56) References Cited

U.S. PATENT DOCUMENTS

| 9,246,195 B1 | 1/2016 | Ahn et al. |
| 2003/0091896 A1 | 5/2003 | Watanabe et al. |

(Continued)

FOREIGN PATENT DOCUMENTS

| CN | 103201877 A | 7/2013 |
| CN | 103636028 A | 3/2014 |

(Continued)

OTHER PUBLICATIONS

International Search Report for Application No. PCT/KR2019/011423, mailed Dec. 26, 2019, pp. 1-2.

(Continued)

*Primary Examiner* — Jimmy Vo
(74) *Attorney, Agent, or Firm* — Lerner David LLP

(57) ABSTRACT

Provided are an interconnect board (ICB) assembly suitable for a battery module of horizontal stack structure including unidirectional battery cells stacked with cell leads facing each other, a battery module comprising the same and a method for fabricating the battery module. The ICB assembly according to the present disclosure includes an ICB frame in which cell leads of unidirectional battery cells are received such that the unidirectional battery cells having the cell leads at one end are placed facing each other with the cell leads facing each other, and busbars assembled in the ICB frame and electrically connected to the cell leads.

13 Claims, 18 Drawing Sheets

(51) Int. Cl.
    *H01M 50/211*     (2021.01)
    *H01M 50/50*     (2021.01)
    *H01M 50/503*     (2021.01)
    *H01M 50/509*     (2021.01)
    *H01M 50/516*     (2021.01)
    *H01M 10/04*     (2006.01)

(52) U.S. Cl.
    CPC ......... *H01M 50/50* (2021.01); *H01M 50/503* (2021.01); *H01M 50/509* (2021.01); *H01M 50/516* (2021.01); *H01M 10/0413* (2013.01)

(58) Field of Classification Search
    CPC ............. H01M 50/503; H01M 10/425; H01M 10/0413
    See application file for complete search history.

(56) References Cited

U.S. PATENT DOCUMENTS

| | | | |
|---|---|---|---|
| 2006/0166086 A1 | 7/2006 | Kato | |
| 2011/0039131 A1 | 2/2011 | Moon | |
| 2012/0121957 A1* | 5/2012 | Kwon | H01M 10/0422 429/99 |
| 2013/0089755 A1 | 4/2013 | Park et al. | |
| 2013/0266823 A1* | 10/2013 | Lee | H01M 50/519 429/7 |
| 2014/0065448 A1 | 3/2014 | Ahn et al. | |
| 2014/0113494 A1 | 4/2014 | Kinoshita et al. | |
| 2015/0236326 A1 | 8/2015 | Kim et al. | |
| 2016/0133890 A1 | 5/2016 | Lee et al. | |
| 2016/0181586 A1 | 6/2016 | Lee | |
| 2016/0197332 A1 | 7/2016 | Lee et al. | |
| 2016/0268658 A1 | 9/2016 | Kong et al. | |
| 2017/0125774 A1 | 5/2017 | Choi et al. | |
| 2018/0048033 A1 | 2/2018 | Lee et al. | |
| 2018/0205053 A1 | 7/2018 | Ryu et al. | |

FOREIGN PATENT DOCUMENTS

| | | |
|---|---|---|
| CN | 104704649 A | 6/2015 |
| CN | 105706273 A | 6/2016 |
| EP | 2639852 A2 | 9/2013 |
| EP | 2996175 A1 | 3/2016 |
| EP | 3054503 A1 | 8/2016 |
| JP | 2003197166 A | 7/2003 |
| JP | 2013542576 A | 11/2013 |
| JP | 2016541095 A | 12/2016 |
| KR | 20110017821 A | 2/2011 |
| KR | 20130039290 A | 4/2013 |
| KR | 20140032596 A | 3/2014 |
| KR | 20150022459 A | 3/2015 |
| KR | 20150022468 A | 3/2015 |
| KR | 101520393 B1 | 5/2015 |
| KR | 20150049461 A | 5/2015 |
| KR | 20150113827 A | 10/2015 |
| KR | 2016-0076209 A | 6/2016 |
| KR | 101686583 B1 | 12/2016 |
| KR | 20160149836 A | 12/2016 |

OTHER PUBLICATIONS

Extended European Search Report for Application No. EP 19859352, dated Mar. 29, 2021, 12 pages.

* cited by examiner

[PRIOR ART]

[PRIOR ART]

[PRIOR ART]

(a)

(b)

(c)

[PRIOR ART]

(a)

(b)

(c)

[PRIOR ART]

(a)

(b)

(a)

(b)

(a)

(b)

(a)

(b)

ICB ASSEMBLY, BATTERY MODULE COMPRISING THE SAME AND METHOD FOR FABRICATING THE BATTERY MODULE

CROSS-REFERENCE TO RELATED APPLICATIONS

The present application is a national phase entry under 35 U.S.C. § 371 of PCT/KR2019/011423, filed on Sep. 4, 2019, and claims priority to Korean Patent Application No. 10-2018-0107985 filed in the Republic of Korea on Sep. 10, 2018, the disclosure of which are each incorporated in their entireties by reference herein.

TECHNICAL FIELD

The present disclosure relates to a battery module and a method for fabricating the battery module, and more particularly, to a battery module that is easy to assemble and can be expanded by a simple process and a method for fabricating the battery module and a component used to fabricate the battery module.

BACKGROUND ART

Due to their high applicability to various products and electrical properties such as a high energy density, secondary batteries are not only commonly applied to portable devices, but universally applied to Electric Vehicles (EVs) or Hybrid Electric Vehicles (HEVs) that are driven by an electric driving source. Secondary batteries are gaining attention for their advantage of remarkably reducing the use of fossil fuels and not generating by-products from the use of energy, making them a new eco-friendly and energy efficient source of energy.

Currently, commonly used secondary batteries include lithium ion batteries, lithium polymer batteries, nickel cadmium batteries, nickel hydrogen batteries and nickel zinc batteries. In the secondary battery, a battery cell has the working voltage of about 2.5V~4.5V. In case that higher output voltage is required, a plurality of battery cells may be connected in series to form a battery pack. The battery pack may be formed by connecting a plurality of battery cells in parallel according to the charge/discharge capacity required for the battery pack. The number of battery cells included in the battery pack may be variously set based on the output voltage or charge/discharge capacity required, and the battery cells may be stacked by various series/parallel connection combinations. Pouch-type battery cells are commonly used for battery packs of medium- and large-sized devices because they are easy to stack and lightweight. When forming the battery pack including battery cells, generally a battery module is formed by series/parallel connection of battery cells, and other components are added to the battery module.

FIG. 1 is a perspective view of a pouch-type battery cell that makes up a unit cell in the general battery module.

The battery cell 110 shown in FIG. 1 is a plate-shaped unidirectional battery cell having cell leads 112 at one end. In detail, the battery cell 110 has a structure in which an electrode assembly 105 is embedded in a pouch-type case 120 of a laminate sheet including a metal layer and a resin layer, and a sealing part SP is formed, for example, by thermal bonding. The cell lead 112 of the positive polarity (+) is connected to a positive electrode plate in the electrode assembly 105, and the cell lead 112 of the negative polarity (−) is connected to a negative electrode plate in the electrode assembly 105.

The unit cell of the battery module may include one battery cell 110, or two or more battery cells 110 connected in series or in parallel. FIG. 4 is a side view of, for example, a 3P bank unit cell including three battery cells 110 connected in parallel.

Referring to FIG. 2, the battery cells 110 lying in the horizontal direction are stacked in the heightwise direction from the ground such that the cell leads 112 of the same polarity are placed in upper and lower positions, and the cell leads 112 placed in upper and lower positions are incorporated. In one unit cell 200, the cell leads 112 are exposed to one side.

In general, the unit cells 200 form a battery module of vertical stack structure. In the battery module of vertical stack structure, the unit cells 200 are vertically arranged with the cell leads 112 placed on one side and stacked side by side and then coupled with one Interconnect Board (ICB) assembly. The ICB assembly includes an ICB frame and a busbar, and achieves an electrical connection of the unit cells 200 by connecting the cell leads 112 and is used to transmit an electrical signal corresponding to the temperature of the battery cells 110 and an electrical signal corresponding to the current or voltage of the battery cells 110 to a battery management system (BMS) during repeated charging and discharging of the battery cells 110. However, it is difficult to apply a method for fabricating the battery module of vertical stack structure and the ICB assembly described above to a battery module of horizontal stack structure in which the unit cells 200 are horizontally placed and stacked such that the cell leads 112 of two unit cells 200 face each other.

FIG. 3 shows an example of the battery module of horizontal stack structure using eight unit cells 200 of FIG. 2.

Referring to FIG. 3, shown is the battery module 250 in which four unit cells 200 are horizontally placed and stacked in the heightwise direction from the ground to form a battery cell assembly 230, and two battery cell assemblies 230 are connected such that the cell leads 112 face each other. Due to the structure of the cell leads 112 facing each other between the two battery cell assemblies 230, it is difficult to weld on the side of the unit cells 200, and it is necessary to weld the unit cells 200 on the top side. For welding on the top side, since it is impossible to form two battery cell assemblies 230 and then weld them, it is necessary to assemble the unit cells 200 in the heightwise direction from the ground, i.e., from bottom to top, by repeating the stacking and welding process in a sequential order, such as placing two unit cells 200 such that the unit cells 200 face each other, welding the cell leads 112 on the top side (first layer), stacking two unit cells 200 thereon such that the unit cells 200 face each other and welding the cell leads 112 on the top side (second layer), and stacking two unit cells 200 thereon such that the unit cells 200 face each other and welding the cell leads 112 on the top side (third layer).

As described above, the battery module 250 of horizontal stack structure is fabricated by a very complex process. In addition, when the Hv terminal (Hv positive/negative) is disposed on top of the battery module 250 of horizontal stack structure, it is very complicate to establish an electrical connection.

FIGS. 4 and 5 show the arrangement of the unit cells 200 that may be contemplated in the battery module 250 such as FIG. 3, and in each figure, (a) shows the battery module 250 when viewed from top and (b) and (c) show the battery module 250 when viewed from the side. Among many arrangements, FIGS. 4 and 5 show, in particular, eight unit cells 200 connected in series.

First, FIG. 4 shows that the unit cells 200 are stacked such that the front surfaces of the unit cells 200 facing each other are all placed upward, and referring to (a), the front surfaces of the unit cells 200 facing each other are all placed upward. In this instance, as shown in (b), the cell leads 112 of the unit cells 200 placed in upper and lower positions may be opposite in polarity in an alternating manner (option 1), or as shown in (c), the cell leads 112 of the unit cells 200 placed in upper and lower positions may have the same polarity (option 2).

Next, FIG. 5 shows that the unit cells 200 are stacked such that one of the unit cells 200 facing each other is placed upside and the other is placed downside, and referring to (a), of the unit cells 200 facing each other, the rear surface of the left unit cell 200 is placed upward and the front surface of the right unit cell 200 is placed upward. In this instance, as shown in (b), the cell leads 112 of the unit cells 200 placed in upper and lower positions may have the same polarity (option 3), or as shown in (c), the cell leads 112 of the unit cells 200 placed in upper and lower positions may be opposite in polarity in an alternating manner (option 4).

As described above, in the battery module 250 of horizontal stack structure, the number of possible arrangements of eight unit cells 200 for series connection is four such as option 1 to option 4, and particularly, when the direction of the Hv terminal is disposed on top of the battery module 250, it is necessary to consider the location when establishing an electrical connection, so difficulty increases. Additionally, series/parallel connection other than the exemplary series connection makes the electrical connection structure complex according to the type. Particularly, there are a large number of possible cases when connecting the cell leads 112 of each unit cell 200 to establish an electrical connection. Accordingly, there is a need for a method for fabricating a battery module by the easiest and simplest connection process among a large number of possible cases, and an ICB assembly necessary to perform the method.

DISCLOSURE

Technical Problem

The present disclosure is designed to solve the above-described problem, and therefore, the present disclosure is directed to providing an interconnect board (ICB) assembly suitable for a battery module of horizontal stack structure including unidirectional battery cells stacked with cell leads facing each other, a battery module comprising the same and a method for fabricating the battery module.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, an interconnect board (ICB) assembly according to the present disclosure includes an ICB frame in which cell leads of unidirectional battery cells may be received such that the unidirectional battery cells having the cell leads at one end are placed facing each other with the cell leads facing each other, and busbars assembled in the ICB frame and electrically connected to the cell leads.

The ICB frame may be formed such that the busbars at least one of the busbars is of a different shape than another one of the busbars.

Preferably, the ICB frame has a plurality of steps and busbar insertion holes to assemble, at any location, at least one of a busbar connected to any one of the cell leads and a busbar connecting a pair of cell leads facing each other among the cell leads.

Additionally, the busbars are a combination of busbars selected from a group of busbars having different shapes that are assembled in the ICB frame through the plurality of steps and the busbar insertion holes, considering an electrical connection relationship between the battery cells.

In an embodiment, the ICB frame is a plate type structure having a length and a width, including a cell lead mounting part, a Hv terminal mounting part and a busbar insertion hole where the cell leads of the battery cells may be placed to face each other on two sides with respect to the lengthwise direction center line.

The busbar may be detachably assembled in the cell lead mounting part.

The cell lead mounting part may be formed at two places along each of first and second sides of a lengthwise direction of the ICB frame, and may include a first cell lead mounting part and a third cell lead mounting part along the first side and a second cell lead mounting part facing the first cell lead mounting part and a fourth cell lead mounting part facing the third cell lead mounting part along the second side, and the Hv terminal mounting part may be formed on each of third and fourth sides in a widthwise direction perpendicular to the first and second sides, and may include a first Hv terminal mounting part on the third side and a second Hv terminal mounting part on the fourth side.

The busbar insertion hole may include a first busbar insertion hole for insertion of the busbar from the third side into the first cell lead mounting part, a second busbar insertion hole for insertion of the busbar from the third side into the second cell lead mounting part, and a through busbar insertion hole formed through the ICB frame parallel to the widthwise direction for insertion of the busbar placed on both the third and fourth cell lead mounting parts.

In an embodiment, in one type of ICB assembly, the busbars include a Hv terminal busbar including a first portion placed on the first Hv terminal mounting part and a second portion placed on the second cell lead mounting part, and a connecting busbar placed on the first cell lead mounting part, and a through busbar placed on both the third and fourth cell lead mounting parts. The Hv terminal busbar is inserted and assembled into the second busbar insertion hole, the connecting busbar is inserted and assembled into the first busbar insertion hole, and the through busbar is inserted and assembled into the through busbar insertion hole.

In an embodiment, in another type of ICB assembly, the busbars include a connecting busbar placed on the first cell lead mounting part, a different connecting busbar placed on the second cell lead mounting part, and a through busbar placed on both the third and fourth cell lead mounting parts. The connecting busbar is inserted and assembled into the first busbar insertion hole, the different connecting busbar is inserted and assembled into the second busbar insertion hole, and the through busbar is inserted and assembled into the through busbar insertion hole.

In an embodiment, in still another type of ICB assembly, the busbar includes a Hv extended busbar including a portion placed on the second Hv terminal mounting part and a portion placed on the first cell lead mounting part, a connecting busbar placed on the second cell lead mounting part, and a through busbar placed on both the third and fourth cell lead mounting parts. The Hv extended busbar is placed and assembled in the second Hv terminal mounting part and the first cell lead mounting part, the connecting busbar is inserted and assembled into the second busbar insertion hole, and the through busbar is inserted and assembled into the through busbar insertion hole.

Preferably, the ICB frame of the ICB assembly is a first ICB frame and connected to a ICB frame via a hinge structure in a lengthwise direction of the first and second ICB frames.

For example, the first and second ICB frames may have a rod shaped protrusion on sides thereof, and the first and second ICB frames arranged along the lengthwise direction may be connected via a joint element between the sides, the joint element having grooves into which the protrusions of the first and second ICB frames are inserted.

Two battery cells may be placed on one ICB frame. In this instance, the busbars are assembled in an upper surface of the ICB frame.

A method for fabricating a battery module according to the present disclosure is performed using the ICB assembly according to the present disclosure.

The method for fabricating a battery module according to the present disclosure includes (a) preparing a plurality of ICB assemblies, each ICB assembly including an ICB frame in which cell leads of unidirectional battery cells may be received such that the unidirectional battery cells having the cell leads at one end are placed facing each other with the cell leads facing each other; and busbars assembled in the ICB frame and electrically connected to the cell leads, wherein the plurality of ICB assemblies is prepared by changing the busbars with the ICB frame of a same shape to differently apply the busbars, (b) laterally connecting and arranging the ICB frames of the ICB assemblies with a hinge structure in a lengthwise direction of the ICB frames, (c) mounting the cell leads on the busbars to horizontally arrange the battery cells on left and right sides of the lengthwise direction of the laterally connected ICB frames such that the battery cells face each other, (d) connecting the ICB assemblies to the arranged battery cells by welding the busbars and the cell leads together on a top side, (e) stacking the battery cells by folding the arranged ICB frames at the hinge structure, and (f) coupling an additional busbar between the busbars exposed to a side of the ICB frame.

A battery module according to the present disclosure includes the ICB assembly according to the present disclosure.

The battery module according to the present disclosure includes units of battery cell—ICB assembly—battery cell stacked in a heightwise direction from a ground, wherein in each unit, unidirectional battery cells having cell leads at one end are connected facing each other with respect to an ICB assembly such that the cell leads face each other, each ICB assembly including an ICB frame in which the cell leads are received; and busbars assembled in the ICB frame and electrically connected to the cell leads, the stacked ICB assemblies are connected with a joint element, and an additional busbar for vertical series connection of the battery cell is coupled to a side of the stacked ICB assemblies, and multiple types of ICB assemblies include the ICB frames having a same shape and the busbars that are differently assembled.

The battery cell preferably includes bank unit cells stacked such that cell leads of same polarity are in contact with each other and connected in parallel.

Additionally, two battery cells facing each other may be horizontally connected in series through the busbars assembled in the ICB assembly.

Advantageous Effects

According to the present disclosure, there are provided an interconnect board (ICB) assembly suitable for a battery module in which unidirectional battery cells having cell leads at one end are horizontally stacked such that the cell leads face each other, and a method for fabricating a battery module using the same.

The ICB assembly of the present disclosure is used to stack the unidirectional battery cells having the cell leads at one end such that the cell leads face each other. Accordingly, the ICB assembly of the present disclosure is convenient for fabrication of the battery module in which the unidirectional battery cells are horizontally stacked, facing each other. The ICB assembly of the present disclosure is different from the ICB assembly used in the conventional battery module of vertical stack structure.

The ICB assembly of the present disclosure may be assembled by differently applying busbars of many shapes to the same ICB frame. Free configuration of electrical connection is possible.

According to an embodiment of the present disclosure, when the ICB frame has a plurality of steps and busbar insertion holes to assemble various types of busbars at any location, busbars of desired shapes may be assembled at desired locations by selecting any combination of steps and busbar insertion holes. The busbars may be provided from the group consisting of busbars of many shapes that may be assembled in the ICB frame through the steps and the busbar insertion holes formed in the ICB frame, and the busbars selected considering a desired electrical connection relationship may be variously combined and assembled in the ICB frame. Accordingly, the ICB frame may be used in various electrical connections by only changing the busbars with the ICB frame of the same shape. Accordingly, the ICB assembly of the present disclosure is used for universal full multipurpose.

Using the ICB assembly of the present disclosure, it is possible to fabricate the battery module by horizontally arranging a plurality of battery cells, simultaneously welding and folding and stacking them. Particularly, according to the method for fabricating a battery module of the present disclosure, it is possible to greatly simplify the fabrication process of the battery module in which unidirectional battery cells are horizontally stacked, facing each other.

Conventionally, the battery module of horizontal stack structure is fabricated by repeating the steps of stacking battery cells and welding cell leads many times in a sequential order, while according to the method for fabricating a battery module of the present disclosure, it is possible to weld battery cells all at once and fold and stack them all at once, so it is very suitable for mass production. Additionally, according to the present disclosure, it is possible to complete the welding of cell leads-busbars and bonding of a sensing wire all at once before stacking the battery cells.

Since the battery module of the present disclosure includes the ICB assembly of the present disclosure, it is very easy to assemble. Additionally, it is possible to expand the battery module by increasing the number of battery cells connected in series through a simple process of adding the unit of battery cell—ICB assembly—battery cell.

According to the present disclosure, among a large number of possible electrical connection relationships between the battery cells that make up the battery module, the easiest and simplest connection may be provided. A hinge structure may be applied as a stack guide for stacking the battery cells, and an electrical connection between the ICB assemblies may be achieved by coupling an additional busbar to the side of the ICB frame.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR DISCLOSURE

Figure 1:
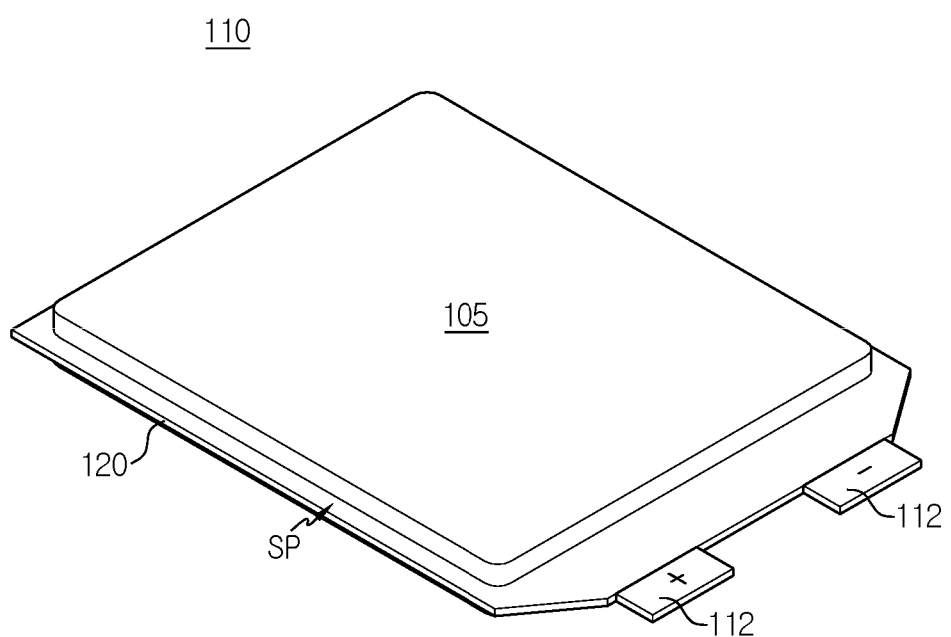
FIG. 1 is a perspective view of a battery cell that makes up a unit cell in the conventional battery module.

Hereinafter, the preferred embodiments of the present disclosure will be described in detail with reference to the accompanying drawings. However, the embodiments according to the present disclosure may be modified in other different forms, and the scope of the present disclosure should not be construed as limited to the following embodiments. The embodiments of the present disclosure are provided to help those having ordinary skill in the art to understand the present disclosure fully and completely.

It should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

The present disclosure provides a component used to fabricate a battery module that is easy to assemble and can be expanded by a simple process, a battery module using the same and a method for fabricating the battery module. Particularly, the present disclosure relates to a new ICB assembly suitable for a battery module including unidirectional battery cells horizontally stacked facing each other. The use of the ICB assembly provides a new method for fabricating a battery module that allows for simultaneous welding and stacking. Additionally, the use of the method provides a battery module that can be expanded by a simple process.

The new ICB assembly may be an assembly of an ICB frame and busbars of various shapes for electrical connection. A plurality of ICB frames may be used according to electrical connection relationships. In this instance, the structure of each ICB frame is the same, but busbars of shapes conforming to electrical connections are differently used.

As described above, the biggest feature of the present disclosure is to easily realize an electrical connection relationship by applying the busbars of different shapes to the ICB frame of the same structure.

In the following embodiment, the present disclosure will be described by describing, for example, a 3P8S the battery module. However, the present disclosure is not limited thereto. The number of battery cells in the unit cell bank may be increased to increase parallel connection. When the unit cell becomes thicker with the increasing number of battery cells, it is spatially bad to stack using the ICB assembly, and to solve the problem, a spacer may be used.

When an increase in series connection is needed, a unit of unit cell—ICB assembly—unit cell is additionally stacked. Two unit cells facing each other with respect to one ICB assembly may be assembled, or four unit cells may be assembled such that two unit cells face each other in each two layer, and as the number of ICB assemblies increases, the number of unit cells has an even fold increase.

Figure 4:
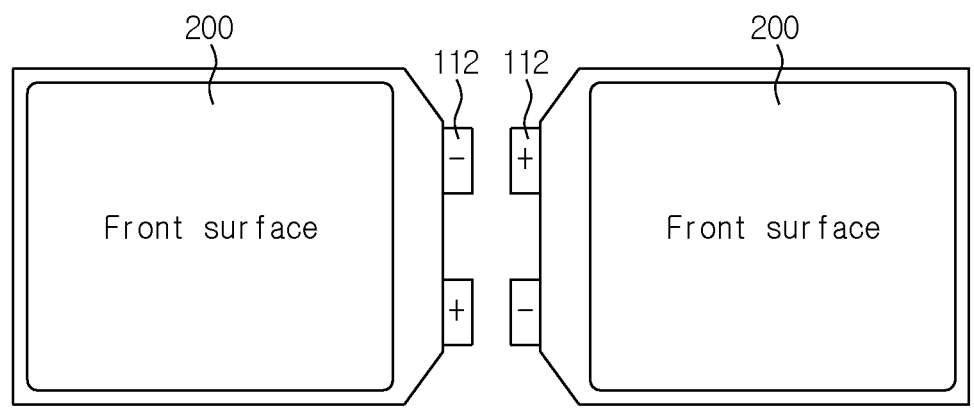
FIGS. 4 and 5 show various arrangements of unit cells in a battery module of horizontal stack structure.
Figure 4:
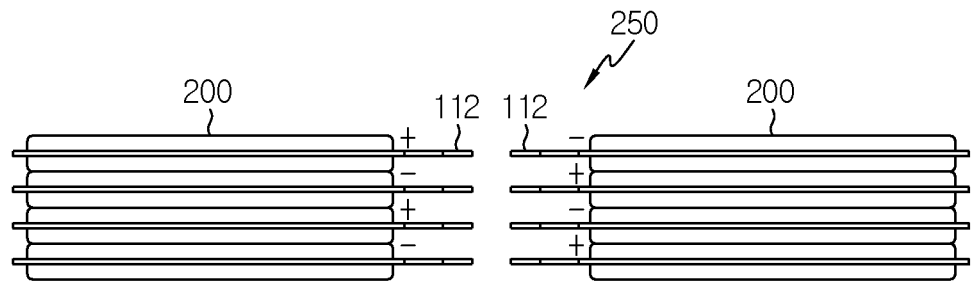
Figure 4:
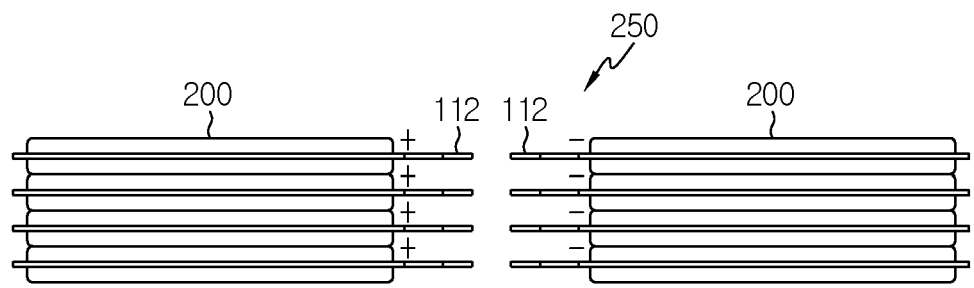
Figure 5:
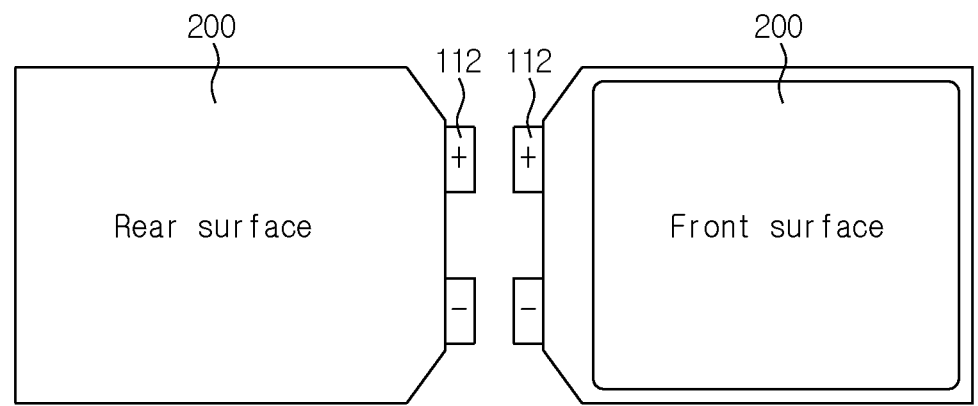
Figure 5:
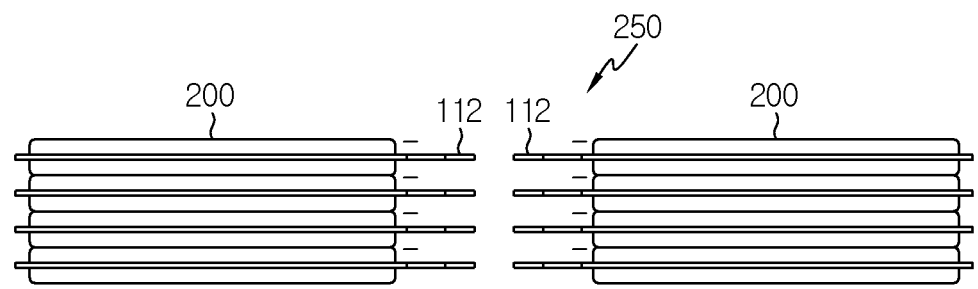
Figure 5:
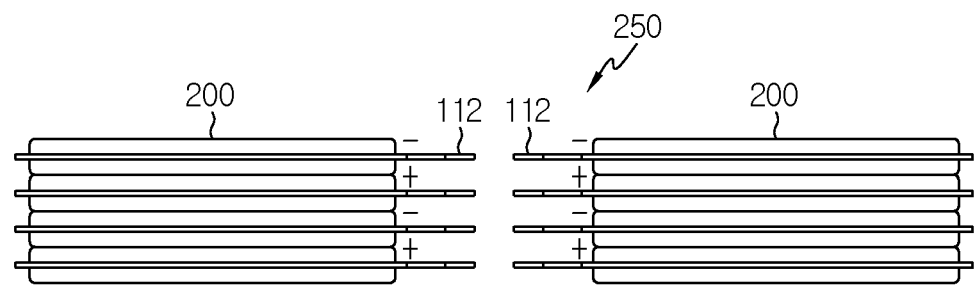

In an embodiment, an example of fabricating a battery module having arrangement such as option 1 in (b) of FIG. 4 is cited.

Figure 6:
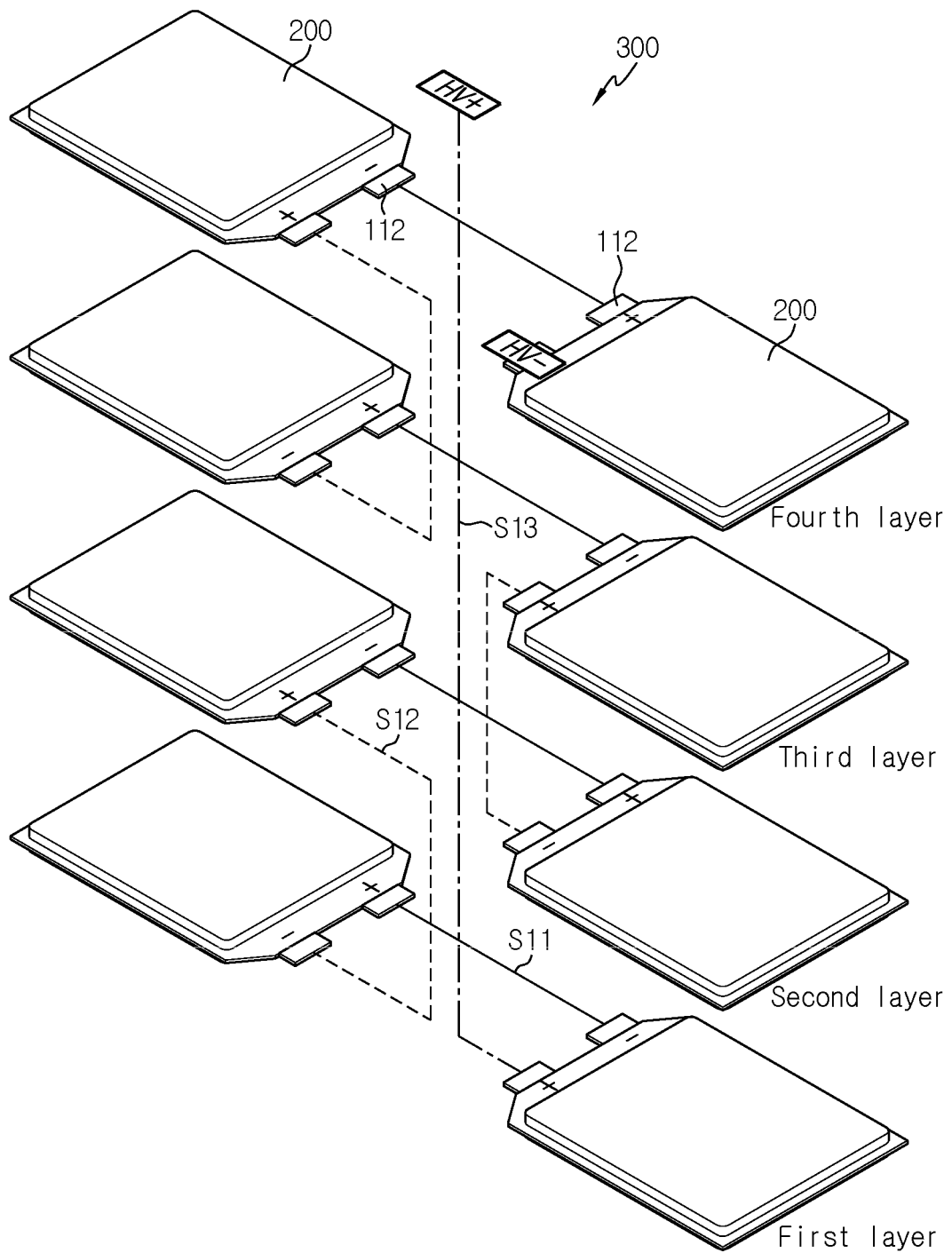
FIG. 6 shows an electrical connection relationship of a 3P8S battery module according to an embodiment of the present disclosure.

FIG. 6 shows an electrical connection relationship of a 3P8S battery module according to an embodiment of the present disclosure.

In FIG. 6, the battery module 300 includes unit cells 200 facing each other, the unit cells 200 are arranged and stacked in a total of four layers in the heightwise direction from the ground such that the front surfaces are placed up, and Hv terminals [positive Hv (Hv+) and negative Hv (Hv−)] are disposed on top of the battery module 300. The cell leads 112 of the unit cells 200 placed in upper and lower positions are arranged such that polarity alternates between positive and negative. The cell leads 112 of the unit cells 200 facing each other are opposite in polarity.

There are a large number of possible electrical connection relationships between the unit cells 200 that make up the battery module 300. The present disclosure provides the easiest and simplest connection.

When a first layer, a second layer, a third layer and a fourth layer are designated in a sequential order in the heightwise direction from the ground, the cell leads 112 of the unit cells 200 facing each other in each layer of the first to fourth layers may be horizontally connected in series (S11) as indicated by the solid line. The cell leads 112 of the unit cells 200 placed in upper and lower positions may be vertically connected in series (S12) as indicated by the dash line.

For example, the negative cell lead 112 of the right unit cell 200 in the fourth layer is connected to the negative Hv (Hv−) on top of the battery module 300. The positive cell lead 112 of the right unit cell 200 in the fourth layer is connected to the negative cell lead 112 of the left unit cell 200 in the fourth layer, so that the left unit cell 200 and the right unit cell 200 in the fourth layer are horizontally connected in series (S11). The positive cell lead 112 of the left unit cell 200 in the fourth layer is connected to the negative cell lead 112 of the left unit cell 200 in the third layer, so that the left unit cell 200 in the fourth layer and the left unit cell 200 in the third layer are vertically connected in series (S12). The positive cell lead 112 of the left unit cell 200 in the third layer is connected to the negative cell lead 112 of the right unit cell 200 in the third layer, so that the left unit cell 200 and the right unit cell 200 in the third layer are horizontally connected in series (S11). The positive cell lead 112 of the right unit cell 200 in the third layer is connected to the negative cell lead 112 of the right unit cell 200 in the second layer, so that the right unit cell 200 in the third layer and the right unit cell 200 in the second layer are vertically connected in series (S12). The positive cell lead 112 of the right unit cell 200 in the second layer is connected to the negative cell lead 112 of the left unit cell 200 in the second layer, so that the right unit cell 200 and the left unit cell 200 in the second layer are horizontally connected in series (S11). The positive cell lead 112 of the left unit cell 200 in the second layer is connected to the negative cell lead 112 of the left unit cell 200 in the first layer, so that the left unit cell 200 in the second layer and the left unit cell 200 in the first layer are vertically connected in series (S12). The positive cell lead 112 of the left unit cell 200 in the first layer is connected to the negative cell lead 112 of the right unit cell 200 in the first layer, so that the left unit cell 200 and the right unit cell 200 in the first layer are horizontally connected in series (S11). The positive cell lead 112 of the right unit cell 200 in the first layer is connected in series (S13) to the positive Hv (Hv+) on top of the battery module 300 as indicated by the dotdash line.

In this embodiment, the battery module 300 is fabricated by applying one ICB frame to every two cell bank unit cells 200 in each layer of the first to fourth layers. One ICB frame is connected between the unit cells 200 in FIG. 6. That is, the ICB frame is required in each layer, and two unit cells 200 are placed on the ICB frame. As described above, the ICB frame connecting two unit cells 200 in the horizontal direction is referred to as type 1 ICB frame. In this embodiment, since there are eight unit cells 200 in total, four type 1 ICB frames in total are required. The ICB frames may be connected side by side in the lengthwise direction, and the ICB frames connected to each other have the same shape. In addition, various electrical connection relationships may be realized by applying busbars of different shapes. For example, the ICB assembly may be formed with various configurations by differently applying busbars of different shapes to the ICB frame of the same shape, for example, applying a Hv terminal busbar and a through busbar to a certain ICB frame and a Hv extended busbar and a through busbar to a different ICB frame, and the battery module 300 may be fabricated using the same.

As described above, the method for fabricating a battery module according to the present disclosure includes, first, preparing many types of ICB assemblies by only changing the busbars with the ICB frame of the same shape to differently apply the busbars. In this embodiment, the ICB assembly may include two unit cells including unidirectional battery cells having cell leads at one end, connected such that the cell leads face each other. Each time the number of unit cells connected in series increases by two, the ICB assembly increases by one. Accordingly, when the number of unit cells connected in series increases to four, six, eight, etc., the number of ICB assemblies required is two, three, four, etc. In this instance, each ICB assembly may be prepared by only changing busbars of different shapes with the ICB frame of the same shape. The busbars are selected, taking into account the electrical connection relationship between the unit cells.

The busbars may be applied to the ICB frame by simply assembling. For example, overlying, insertion or interleaving may be used. The busbars are detachably assembled in the ICB frame. That is, once assembled, the busbars are not permanently coupled, and when necessary or modification is required, the busbars may be deassembled from the assembled locations.

Figure 7:
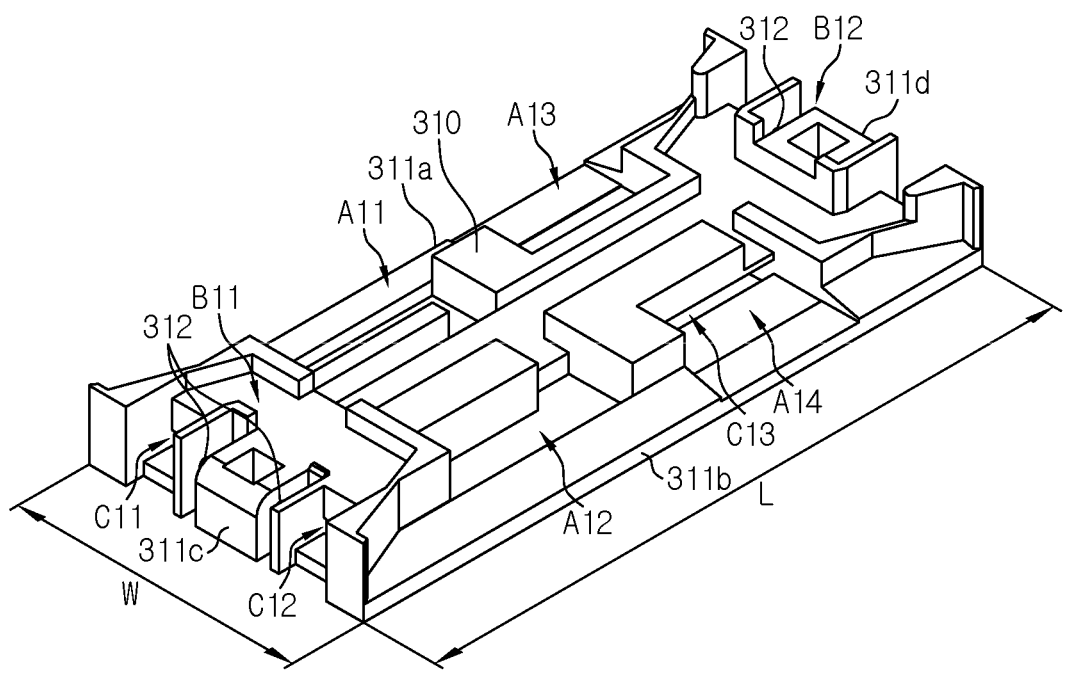
FIG. 7 is a perspective view of an interconnect board (ICB) frame according to an embodiment of the present disclosure.

FIG. 7 is a perspective view of the ICB frame according to an embodiment of the present disclosure, type 1 ICB frame having no busbar assembled therein.

Referring to FIG. 7, the ICB frame 310 may be provided between unidirectional battery cells (in this embodiment, the unit cells 200 of FIG. 2) such that cell leads face each other. The unidirectional battery cells are placed facing each other on two sides of the ICB frame 310, and thus the ICB frame 310 may be referred to as a 'central' ICB frame.

The ICB frame 310 has cell lead mounting parts A11~A14 and Hv terminal mounting parts B11, B12. The ICB frame 310 has busbar insertion holes C11~C13 as well. The cell lead mounting parts A11~A14 and the Hv terminal mounting parts B11, B12 are steps formed in ICB frame 310.

As described above, the ICB frame 310 is a plate-shaped structure that occupies an approximately rectangular space having a length L approximately equal to the side of the cell lead of the battery cell so that the cell lead of the battery cell can be placed, and a narrower width W, and has busbars of various shapes for electrical connection with the cell leads of the battery cells for assembly at any location.

The cell lead mounting parts A11~A14 are formed at two places on each of first and second sides 311*a*, 311*b* of the lengthwise L direction such that unidirectional battery cells are placed, facing each other, on two sides with respect to the lengthwise L direction center line of the ICB frame 310. Accordingly, the first cell lead mounting part A11 and the third cell lead mounting part A13 are formed along the first side 311*a*, and the second cell lead mounting part A12 facing the first cell lead mounting part A11 and the fourth cell lead mounting part A14 facing the third cell lead mounting part A13 are formed along the second side 311b.

For example, the cell leads of the left unit cell are placed on the cell lead mounting parts A11, A13 formed on the first side 311a, and cell leads of a different unit cell facing the cell leads of the left unit cell, for example, the right unit cell are placed on the cell lead mounting parts A12, A14 formed on the second side 311b.

The Hv terminal mounting parts B11, B12 are respectively formed on the third and fourth sides 311c, 311d of the widthwise W direction perpendicular to the sides 311a, 311b of the lengthwise L direction. The first Hv terminal mounting part B11 is formed on the third side 311c, and the second Hv terminal mounting part B12 is formed on the fourth side 311d.

The busbar insertion holes C11, C12 may be formed on one side of the widthwise W direction. For example, the busbar insertion holes C11, C12 may be formed on the third side 311c where the first Hv terminal mounting part B11 is formed. The first busbar insertion hole C11 is for insertion and assembly of a busbar from the third side 311c into the first cell lead mounting part A11, and the second busbar insertion hole C12 is for insertion and assembly of other busbar from the third side 311c into the second cell lead mounting part A12.

The through busbar insertion hole C13 is formed through the ICB frame 310 parallel to the widthwise W direction, and for example, is closer to the second Hv terminal mounting part B12 than the first Hv terminal mounting part B11, and provided to assemble another busbar that is placed on both the third and fourth cell lead mounting parts A13, A14.

The ICB frame 310 shown has busbars assembled on the upper surface. The cell leads 112 of the unit cells 200 are placed on the assembled busbars, and an electrical connection of the cell leads 112 of the unit cells 200 is established on the upper surface of the ICB frame 310. Additionally, since the ICB frame 310 has the first to fourth cell lead mounting parts A11~A14 and the first and second Hv terminal mounting parts B11, B12 on the upper surface, the upper surface of the ICB frame 310 has projected and recessed portions, forming steps. In contrast, the lower surface of the ICB frame 310 is not used in the electrical connection, and may be generally flat. The ICB frame 310 may be made of a plastic molding material. Additionally, the ICB frame 310 may be designed with the thickness (the thickness in the heightwise direction from the ground) that is similar to the thickness (the thickness in the heightwise direction from the ground) of the unit cell 200. When the unit cell 200 increases in thickness with the increasing number of battery cells included in the unit cell 200, then the ICB frame 310 also increases in thickness. However, when it is impossible to continue to increase the thickness of the ICB frame 310 indefinitely, a separate structure such as a spacer that is placed on the ICB frame 310 may be introduced to bring an additionally increased thickness to the ICB frame 310 so that the thickness of the ICB frame 310 is equal to the thickness of the unit cell 200.

As described above, the ICB frame 310 has the plurality of steps and busbar insertion holes C11~C13. The steps and the busbar insertion holes are provided to assemble a busbar connected to any one of cell leads that are placed on the ICB frame 310, or a busbar connecting cell leads placed facing each other at any location.

Figure 8:
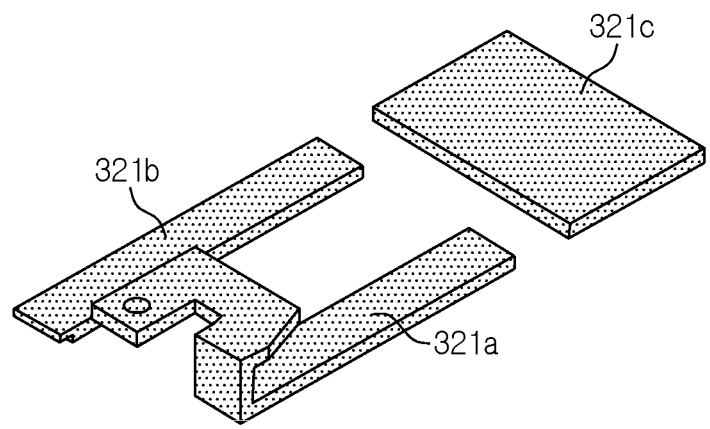
FIGS. 8 to 10 are exploded perspective views of ICB assemblies according to an embodiment of the present disclosure.
Figure 8:
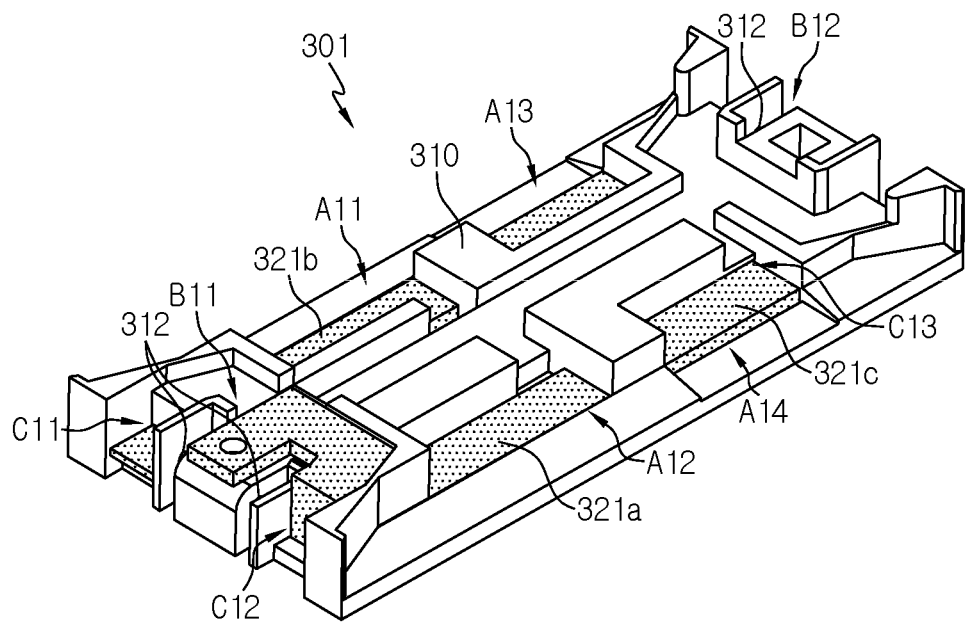
Figure 9:
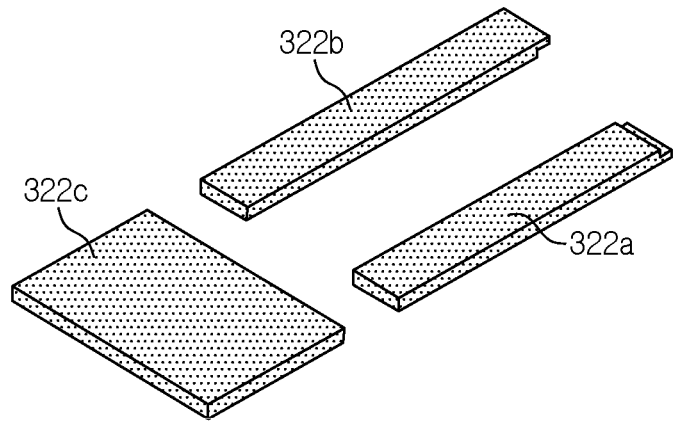
Figure 9:
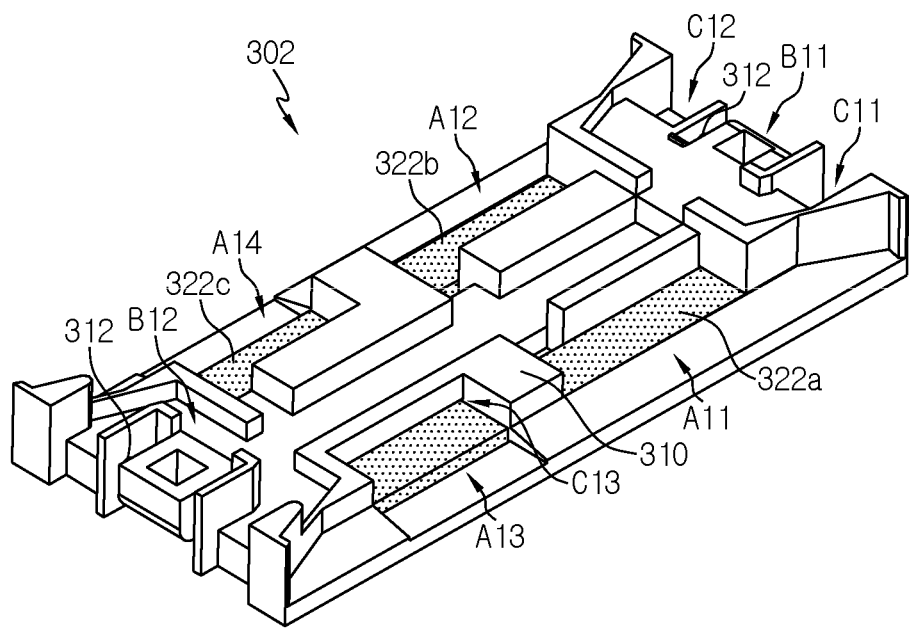
Figure 10:
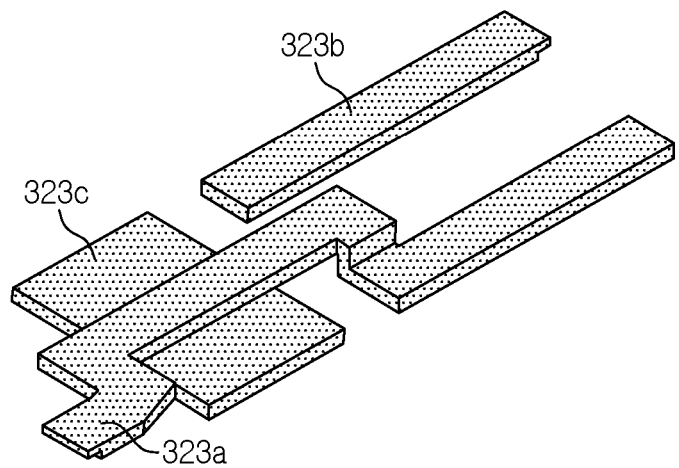
Figure 10:
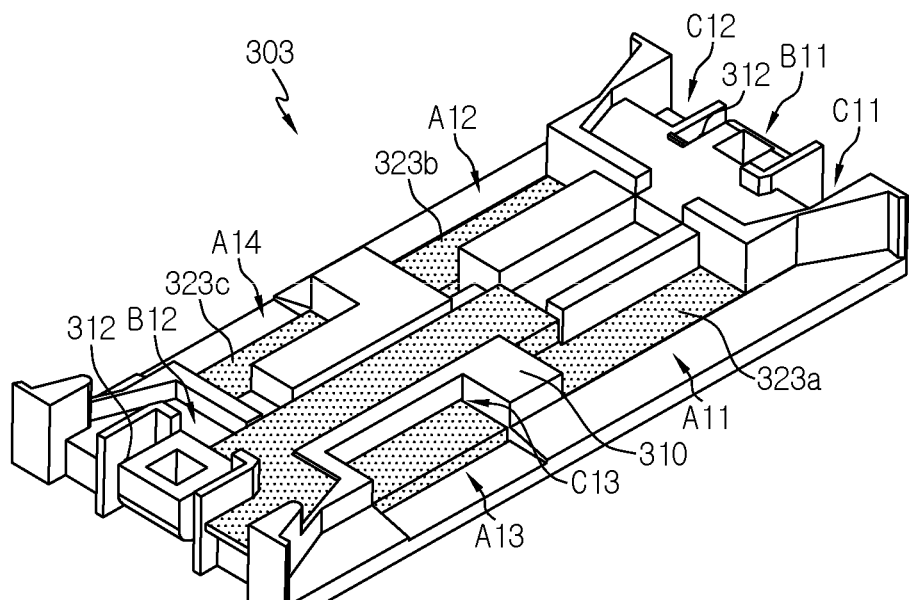

FIGS. 8 to 10 show various ICB assemblies according to the present disclosure. In each drawing. (a) shows busbars that are assembled in the ICB frame, and (b) shows the ICB frame having the assembled busbars of (a).

Referring to FIGS. 8 to 10, all the ICB assemblies 301, 302, 303 of the present disclosure include the ICB frame 310 of FIG. 7. The ICB assemblies 301, 302, 303 may further include a printed circuit board or a wire component for voltage sensing. The printed circuit board or the wire component for voltage sensing may be further connected to the ICB assemblies 301, 302, 303. The ICB assemblies 301, 302, 303 include the ICB frame 310 and busbars of many shapes in various combinations. The busbars are assembled in the ICB frame 310 and electrically connected to the cell leads 112 of the unit cells 200.

First, the ICB assembly 301 of FIG. 8 is used for the fourth layer present in the top layer of the electrical connection relationship of FIG. 6, and includes the ICB frame 310 and busbars 321a, 321b, 321c assembled in the ICB frame 310.

The busbar 321a is a Hv terminal busbar, and includes a portion placed on the first Hv terminal mounting part B11 and a portion placed on the second cell lead mounting part A12. When the portion of the busbar 321a that is placed on the second cell lead mounting part A12 is inserted and pushed into the second busbar insertion hole C12 of the ICB frame 310, the busbar 321a is assembled in the first Hv terminal mounting part B11 and the second cell lead mounting part A12 as shown in FIG. 8. In the subsequent process, the busbar 321a is connected to the negative cell lead 112 of the right unit cell 200 in the fourth layer. Accordingly, the busbar 321a forms negative Hv (Hv−) on top of the battery module 300.

The busbar 321b is a connecting busbar including a portion placed on the first cell lead mounting part A11. When the busbar 321b is inserted and pushed into the first busbar insertion hole C11 of the ICB frame 310, the busbar 321b is assembled in the first cell lead mounting part A11 as shown in FIG. 8.

The busbar 321c is a through busbar, and is inserted through the through busbar insertion hole C13 of the ICB assembly 301 and assembled such that the busbar 321c is placed on both the third and fourth cell lead mounting parts A13, A14. In the subsequent process, the busbar 321c is connected to both the cell lead of the unit cell placed on the third cell lead mounting part A13 and the cell lead of a different unit cell placed on the fourth cell lead mounting part A14 on the opposite side to connect in series the two unit cells facing each other. Accordingly, the busbar 321b is configured to establish the horizontal series connection "S11" of FIG. 6 between the unit cells facing each other. As described above, the ICB assembly 301 is a component that establishes the series connection S11 between the two unit cells 200 in the fourth layer present in the top layer of the battery module 300 in the electrical connection relationship of FIG. 6 through the busbar 321c, and forms the negative Hv (Hv−) on top of the battery module 300 through the busbar 321a.

The ICB assembly 302 of FIG. 9 is an assembly of the ICB frame 310 in a 180° vertical horizontal rotation relationship with the ICB frame 310 of FIG. 7 and busbars 322a, 322b, 322c, and is a component for use in the third and second layers present in the intermediate layer of the electrical connection relationship of FIG. 6.

The busbar 322a is a connecting busbar, and is inserted through the first busbar insertion hole C11 of the ICB frame 310 and assembled in the first cell lead mounting part A11. The busbar 322b is also a connecting busbar, and is inserted through the second busbar insertion hole C12 of the ICB frame 310 and assembled in the second cell lead mounting part A12.

The busbar 322c of FIG. 9 is the same as the busbar 321c of FIG. 8. Accordingly, the busbar 322c is a through busbar, and is inserted through the through busbar insertion hole C13 of the ICB frame 310 and placed on the third and fourth cell lead mounting parts A13, A14. Accordingly, the busbar 322c establishes the horizontal series connection "S11" of FIG. 6 between the unit cells facing each other.

Figure 13:
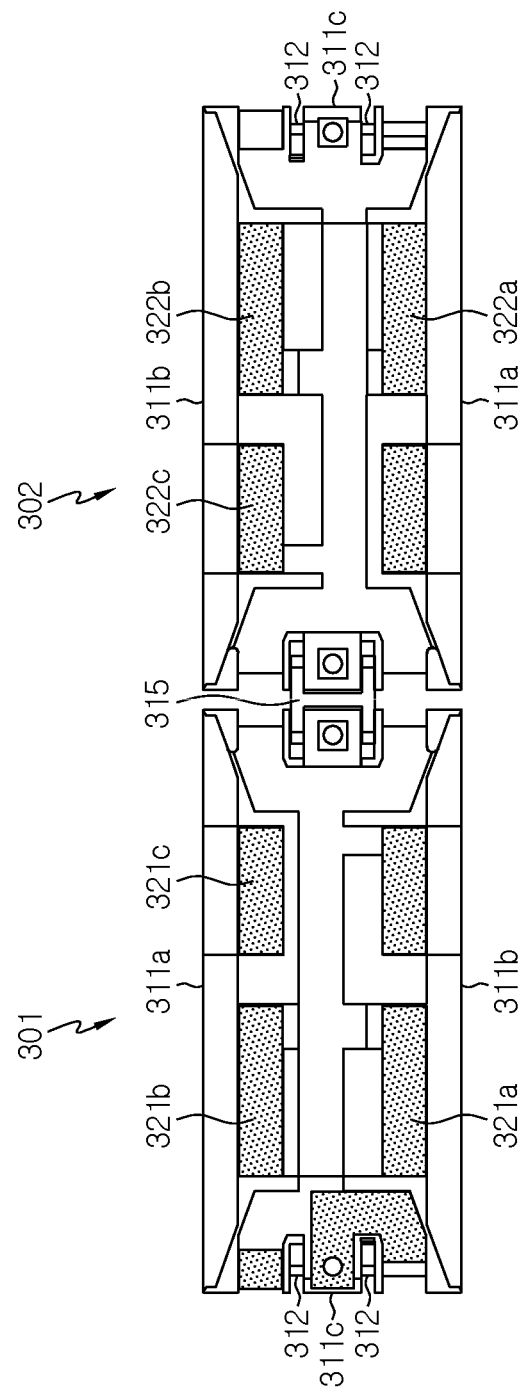
FIG. 13 shows ICB assemblies connected using the joint element of FIG. 12.

Two ICB assemblies 302 are require, and one may be used to establish the series connection S11 between the two unit cells in the third layer in the electrical connection relationship of FIG. 6 through the busbar 322c, and the other may be used to establish the series connection S11 between the two unit cells in the second layer in the electrical connection relationship of FIG. 13 through the busbar 322c.

The ICB assembly 303 of FIG. 10 is an assembly of the ICB frame 310 in a 180° horizontal rotation relationship with the ICB frame 310 of FIG. 7 and busbars 323a, 323b, 323c, and is a component for used in the first layer present in the bottom layer of the electrical connection relationship of FIG. 6.

The busbar 323a is a Hv extended busbar, and is used for connection to the positive Hv (Hv+) formed on top of the battery module 300. The busbar 323a is used for series connection from bottom of the battery module 300 to top, and in the subsequent process, the positive cell lead 112 of the right unit cell 200 in the first layer is connected to the busbar 323a to establish "S13" of FIG. 6. The busbar 323a includes a portion placed on the second Hv terminal mounting part B12 of the ICB frame 310 and a portion placed on the first cell lead mounting part A11, and accordingly, is assembled such that the busbar 323a is placed on the second Hv terminal mounting part B12 and the first cell lead mounting part A11.

The busbar 323b is a connecting busbar, and is inserted through the second busbar insertion hole C12 of the ICB frame 310 and assembled in the second cell lead mounting part A12. The busbars 321a, 322a, 322b, 323b are all the connecting busbars, and may have the same shape.

The busbar 323c of FIG. 10 is the same as the busbars 321c. 322c described above in FIGS. 8 and 9. The busbar 323c is inserted through the through busbar insertion hole C13 of the ICB frame 310 and assembled such that the busbar 323c is placed on the third and fourth cell lead mounting parts A13, A14. In the same way as the busbars 321c, 322c, the busbar 323c is connected to both the cell lead of the unit cell placed on the third cell lead mounting part A13 and the cell lead of a different unit cell placed on the fourth cell lead mounting part A14 at the opposite side to establish a series connection between the battery cells facing each other. Accordingly, the busbar 323c is configured to horizontally connect in series the unit cells facing each other, establishing "S11" of FIG. 13. The ICB assembly 303 establishes the series connection S11 between the two unit cells 200 in the first layer present at the lowest layer of the battery module 300 in the electrical connection relationship of FIG. 13 through the busbar 323c, and the series connection S13 between the positive cell lead 112 of the right unit cell 200 in the first layer and the positive Hv (Hv+) on top of the battery module 300 through the busbar 323a.

As described above, the busbars 321a, 321b, 321c, 322a, 322b, 322c, 323a, 323b, 323c are a combination of busbars selected from the group consisting of busbars of many shapes that may be assembled in the ICB frame 310 through the steps and the busbar insertion holes C11~C13 formed in the ICB frame 310, considering the electrical connection relationship between the unit cells 200.

As described above, since the ICB frame 310 has the plurality of steps and busbar insertion holes C11~C13 so that various types of busbars may be assembled at any location, any combination of the steps and the busbar insertion holes C11~C13 may be selected and busbars of desired shapes may be assembled at desired locations. The busbars may be provided with the group consisting of busbars of many shapes that may be assembled in the ICB frame 310 through the steps and the busbar insertion holes C11~C13 formed in the ICB frame 310, and among them, a busbar selected considering a desired electrical connection relationship, and particularly, in this embodiment, various combinations of the busbars 321a, 321b, 321c. 322a, 322b, 322c, 323a, 323b, 323c may be assembled in the ICB frame 310.

Described is an example in which, for the same ICB frame 310, the busbars 321a, 321b, 321c may be assembled to form the ICB assembly 301, the busbars 322a, 322b, 322c may be assembled to form the ICB assembly 302, and the busbars 323a, 323b, 323c may be assembled to form the ICB assembly 303. As described above, it is possible to use the ICB frame in many electrical connections by changing busbars of many shapes with the ICB frame of the same shape. Accordingly, the ICB assembly of the present disclosure is used for universal full multipurpose.

The ICB assembly of the present disclosure may be assembled by differently applying busbars of many shapes to the same ICB frame. Free configuration of electrical connection is possible.

Meanwhile, the shape of the ICB assemblies 301, 302, 303 shown in FIGS. 8 to 10 is provided for illustration only and the ICB assembly of the preset disclosure may have other shapes. In this embodiment, a 3P8S battery module is taken as an example. As the unit cells 200 are connected in parallel using 3P structure, the busbars 321a, 321b, 321c, 322a, 322b, 322c, 323a, 323b, 323c of the ICB frame 310 are taken as an example for series connection of the unit cells 200. It should be understood that the shape of the ICB frame and the shape and location of the busbar assembled in the ICB frame may differ depending on series/parallel connection structure in the battery module.

Figure 11:
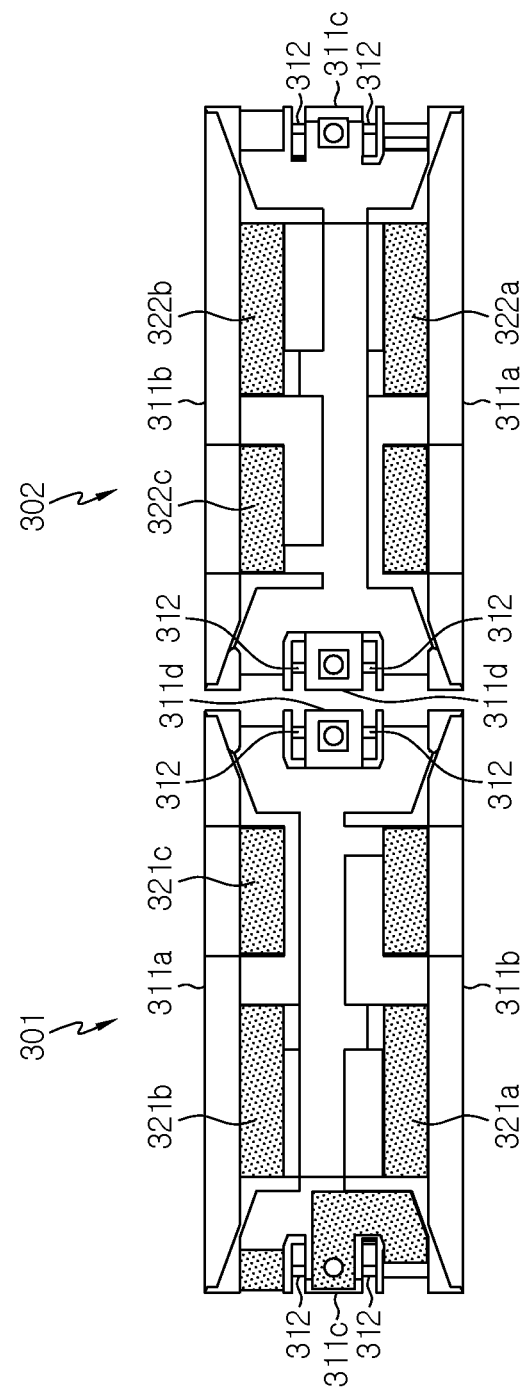
FIG. 11 is a diagram illustrating a connection method of ICB assemblies according to an embodiment of the present disclosure.

The ICB assemblies 301, 302, 303 may be connected side by side in the lengthwise L direction of the ICB frame 310. That is, the ICB assemblies 301, 302, 303 may be connected to other ICB frame 310 in the lengthwise L direction of the ICB frame 310. For example, as shown in FIG. 11, the ICB assembly 302 may be placed next to the ICB assembly 301 and they may be connected to each other. FIG. 11 shows the fourth side 311d of the ICB frame 310 of the ICB assembly 301 placed next to the fourth side 311d of the ICB frame 310 of the ICB assembly 302.

Figure 12:
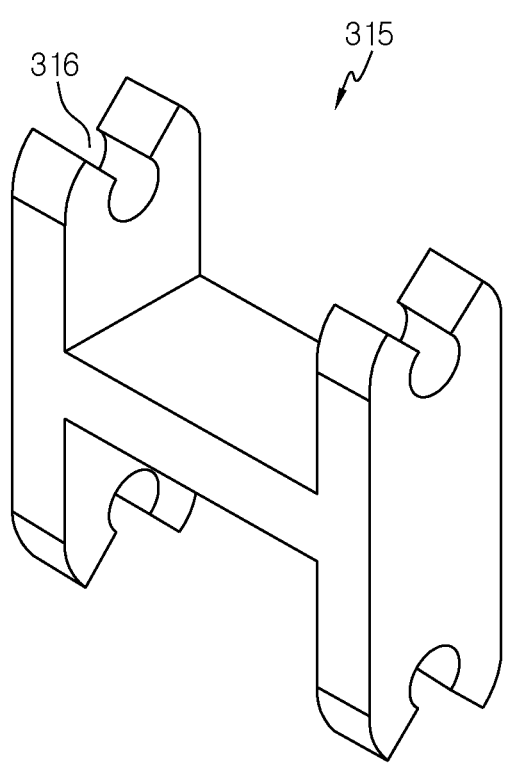
FIG. 12 is a perspective view of a joint element used to connect ICB assemblies.

In this instance, a joint element 315 as shown in FIG. 12 may be used. It is desirable to connect two ICB frames 310 with a hinge structure so that the ICB frames 310 pivot around the joint element 315. To this end, a rod-shaped protrusion 312 is formed on the side of the ICB frame 310, the two ICB frames 310 arranged along the lengthwise L direction may be connected with the joint element 315 between their sides. In this embodiment, the joint element 315 is in an approximately H shape and has a groove 316 at four ends. The protrusions 312 formed on the sides of the ICB frame 310, and in this embodiment, the third and fourth sides 311c, 311d may be inserted into the grooves 316.

FIG. 13 shows that the side of the ICB frame 310 of the ICB assembly 301 is connected to the side of the ICB frame 310 of the ICB assembly 302 along the lengthwise direction using the joint element 315.

When the rod-shaped protrusions 312 are formed on the third and fourth sides 311c. 311d of the ICB frame 310 and the grooves 316 of the joint element 315 are formed in the shape of letter C for insertion of the rod, the two ICB frames 310 may be connected by inserting the protrusions 312 of the ICB frame 310 into the openings of the grooves 316. Additionally, when the protrusion 312 rotates within the groove 316 or the groove 316 moves around the protrusion 312, the two ICB frames 310 may pivot around the joint element 315.

In this embodiment, an example is cited in which the two protrusions 312 of the ICB frame 310 on one side are each inserted into two ends of the joint element 315, the two protrusions 312 of the ICB frame 310 on the other side are each inserted into two ends on the opposite side, and an approximately H shape is placed on the plane lying down along the lengthwise direction of the ICB frame 310. If a hinge connection structure can be realized, the structure of the joint element 315 and the protrusion 312 is not limited to the shown example, and may be variously formed.

As described above, the method for fabricating a battery module according to the present disclosure includes laterally connecting the ICB frames 310 of the ICB assemblies 301, 302, 303 prepared as described above with the hinge structure and arranging in the lengthwise L direction of the ICB frame 310.

Figure 14:
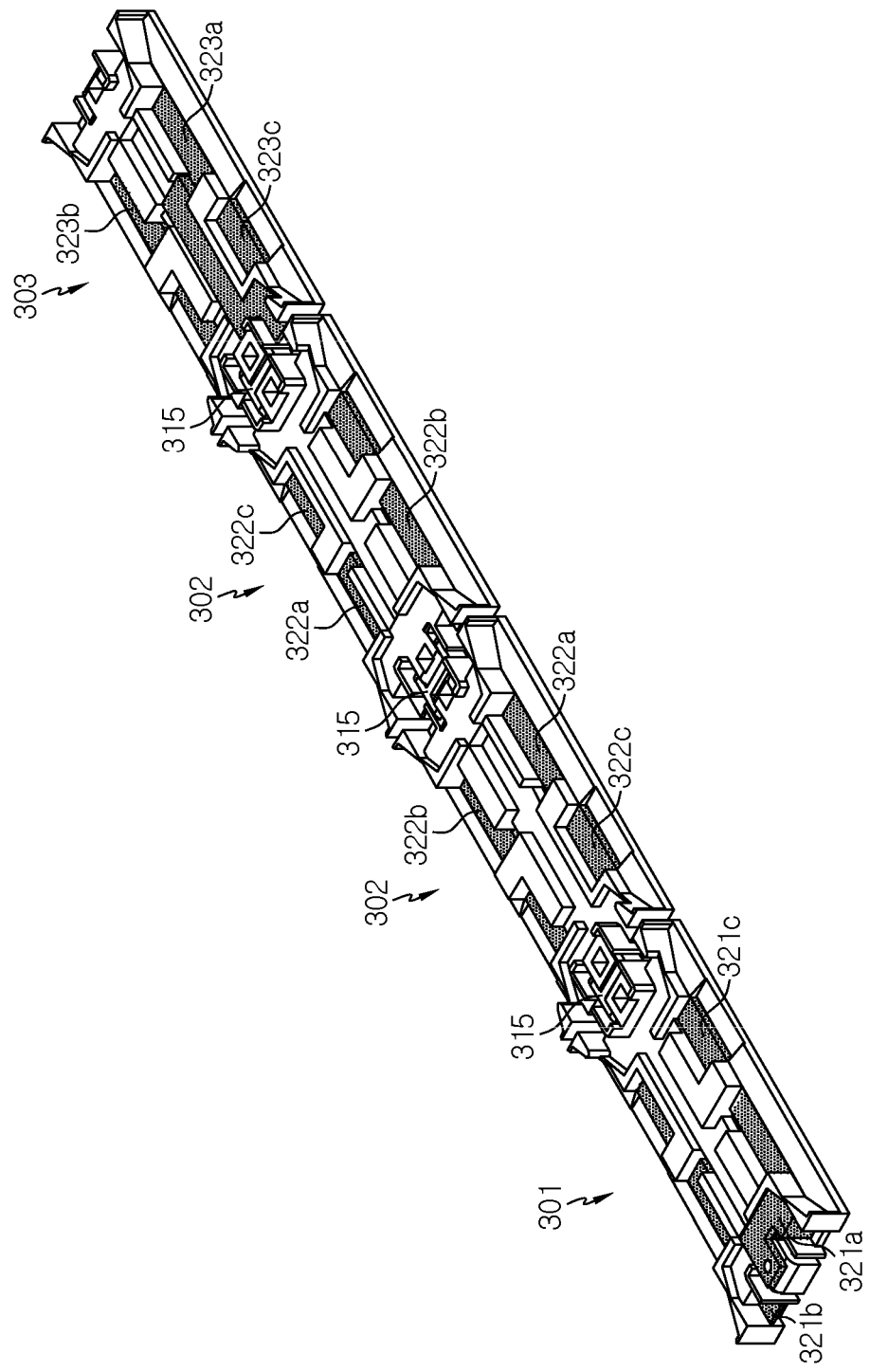
FIG. 14 shows four ICB assemblies of FIGS. 8 to 10 arranged by side connection.

FIG. 14 shows four ICB frames 310 of the ICB assemblies 301, 302, 303 laterally connected and arranged in the lengthwise L direction using the joint element 315 as described in FIG. 12.

To the ICB frame 310 of the leftmost ICB assembly 301, the ICB frame 310 of the next ICB assembly 302 is horizontally connected by 180°. To the ICB frame 310 of the ICB assembly 302, the ICB frame 310 of the right ICB assembly 302 is horizontally connected by 180° in the same direction as the ICB frame 310 of the ICB assembly 301. The ICB frame 310 of the rightmost ICB assembly 303 is horizontally connected thereto by 180°.

In this embodiment, a 3P8S battery module is taken as an example. Since two unit cells 200 may be connected to one ICB frame 310, it should be understood that four ICB frames 310 are necessary to connect a total of eight unit cells. Additionally, it can be seen that the number of ICB frames required may vary depending on the number of unit cells in the battery module.

The method for fabricating a battery module according to the present disclosure includes horizontally arranging the unit cells using the ICB assemblies laterally connected as described above. Additionally, the method includes simultaneously welding the arranged unit cells on the top side.

Figure 15:
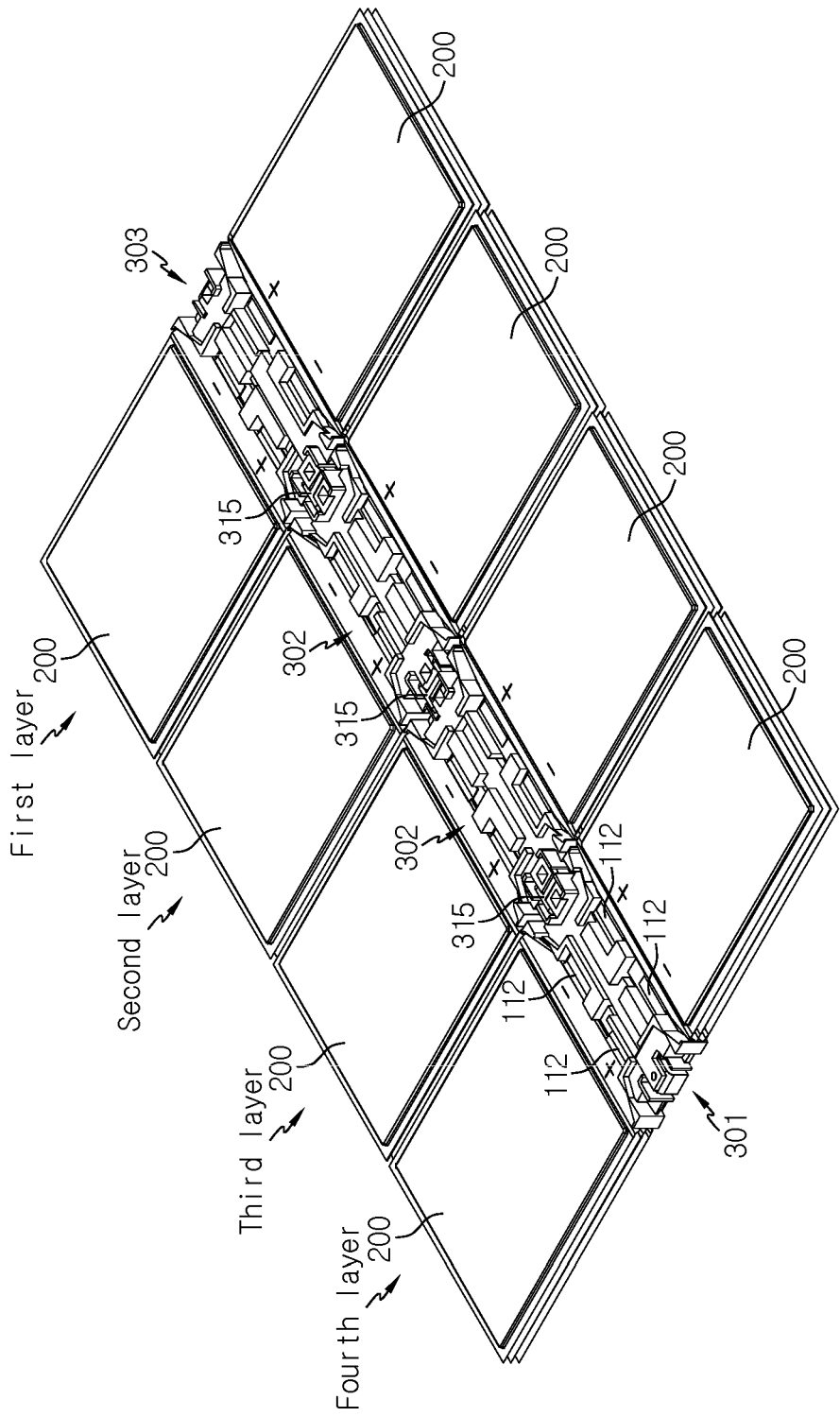
FIG. 15 is a diagram illustrating a unit cell mounting step and a top welding step in a method for fabricating a battery module according to an embodiment of the present disclosure.

FIG. 15 is a diagram illustrating the unit cell mounting step and the welding step in a method for fabricating a battery module according to an embodiment of the present disclosure.

Figure 2:
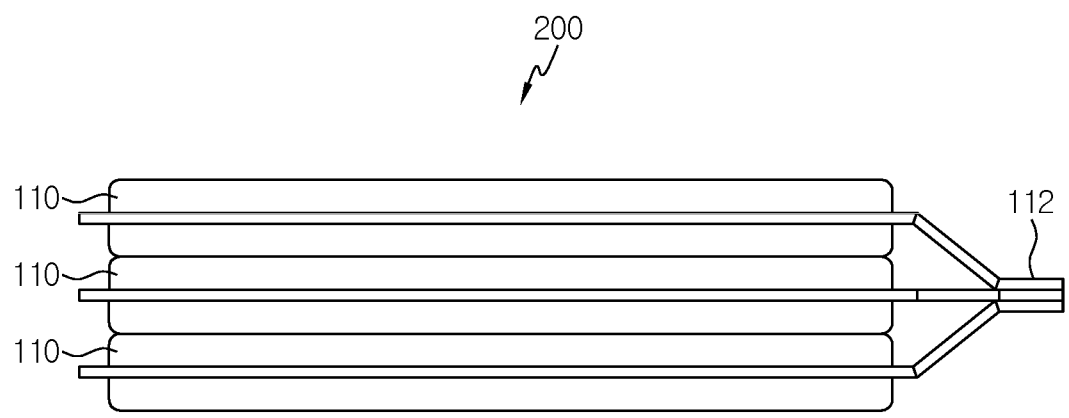
FIG. 2 is a side view of a unit cell that may be included in the conventional battery module.
Figure 3:
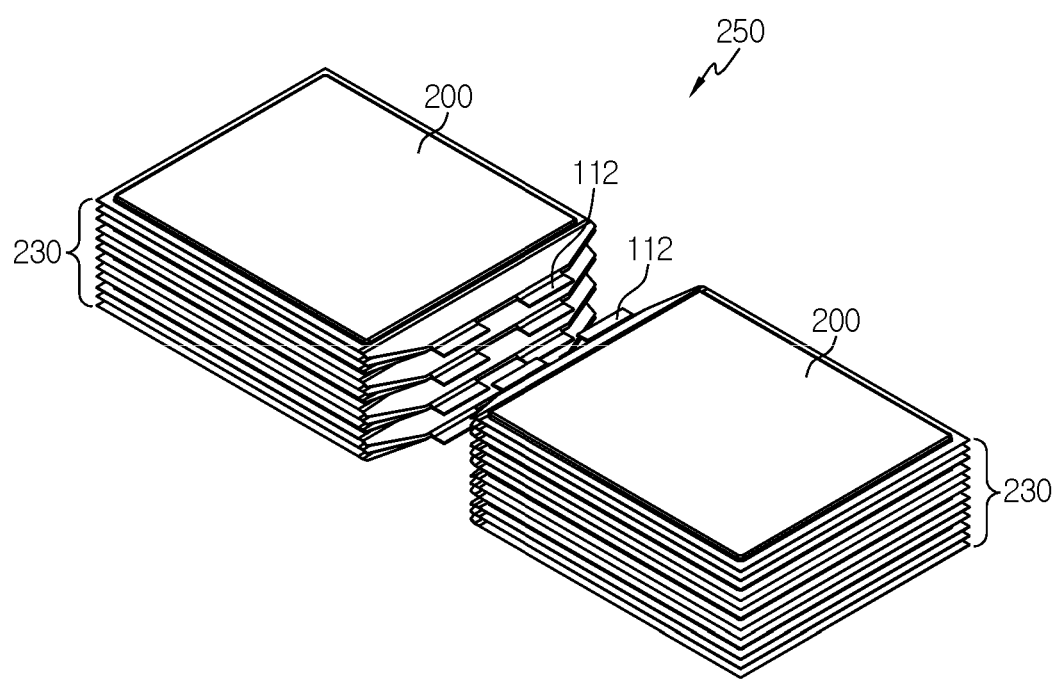
FIG. 3 shows an example of a battery module of horizontal stack structure including unit cells of FIG. 2.

As shown in FIG. 14, the necessary number of ICB assemblies 301, 302, 303 are arranged and their ICB frames 310 are laterally connected with the joint element 315, and referring to FIG. 15, the cell leads 112 of the unit cells 200 as described in FIG. 2 are mounted on the cell lead mounting parts A11~A14 of the ICB frame 310. The unit cells 200 are placed on the left and right sides with respect to one ICB frame 310. In the ICB assemblies 301, 302, 303, the busbars 321a, 321b, 321c. 322a, 322b, 322c, 323a, 323b, 323c are assembled in each cell lead mounting part A11~A14 of the ICB frame 310. The cell leads 112 of the unit cells 200 are placed on the busbars 321a, 321b, 321c, 322a, 322b, 322c. 323a, 323b, 323c.

In this instance, the cell leads 112 facing each other with respect to the ICB frame 310 are opposite in polarity to realize the electrical connection relationship as shown in FIG. 6. To realize a different electrical connection relationship from that of FIG. 6, the cell leads 112 facing each other may have the same polarity, and accordingly, the type and shape of busbars coupled to the ICB frame 310 may differ, and as a consequence, the shape of the ICB frame 310 may differ.

To help understanding, FIG. 15 shows the corresponding parts to the first to fourth layers in the electrical connection relationship of FIG. 6. A total of eight unit cells 200 are all horizontally arranged such that the cell leads 112 of each unit cell 200 are mounted on the busbars 321a, 321b, 321c. 322a, 322b, 322c. 323a, 323b, 323c, and the cell leads 112 of each unit cell 200 and the underlying busbars 321a, 321b, 321c, 322a, 322b, 322c, 323a, 323b, 323c are welded together on the top side to connect them. Accordingly, the ICB assemblies 301, 302, 303 and the unit cells 200 are connected. Laser welding or ultrasonic welding may be used. When a wire component for voltage sensing is further included, the component may be welded together in this process.

When the welding of FIG. 15 is performed, the unit cells 200 facing each other are connected to the through busbars 321c. 322c. 323c and thereby electrically connected to each other, while the unit cells 200 placed side by side along the arrangement direction of the ICB frames 310 are not electrically connected to each other. That is, although FIG. 6 shows that the cell leads 112 of the unit cells 200 facing each other are horizontally connected in series (S11), the cell leads 112 of the unit cells 200 placed in upper and lower positions are not vertically connected in series (S12).

Figure 16:
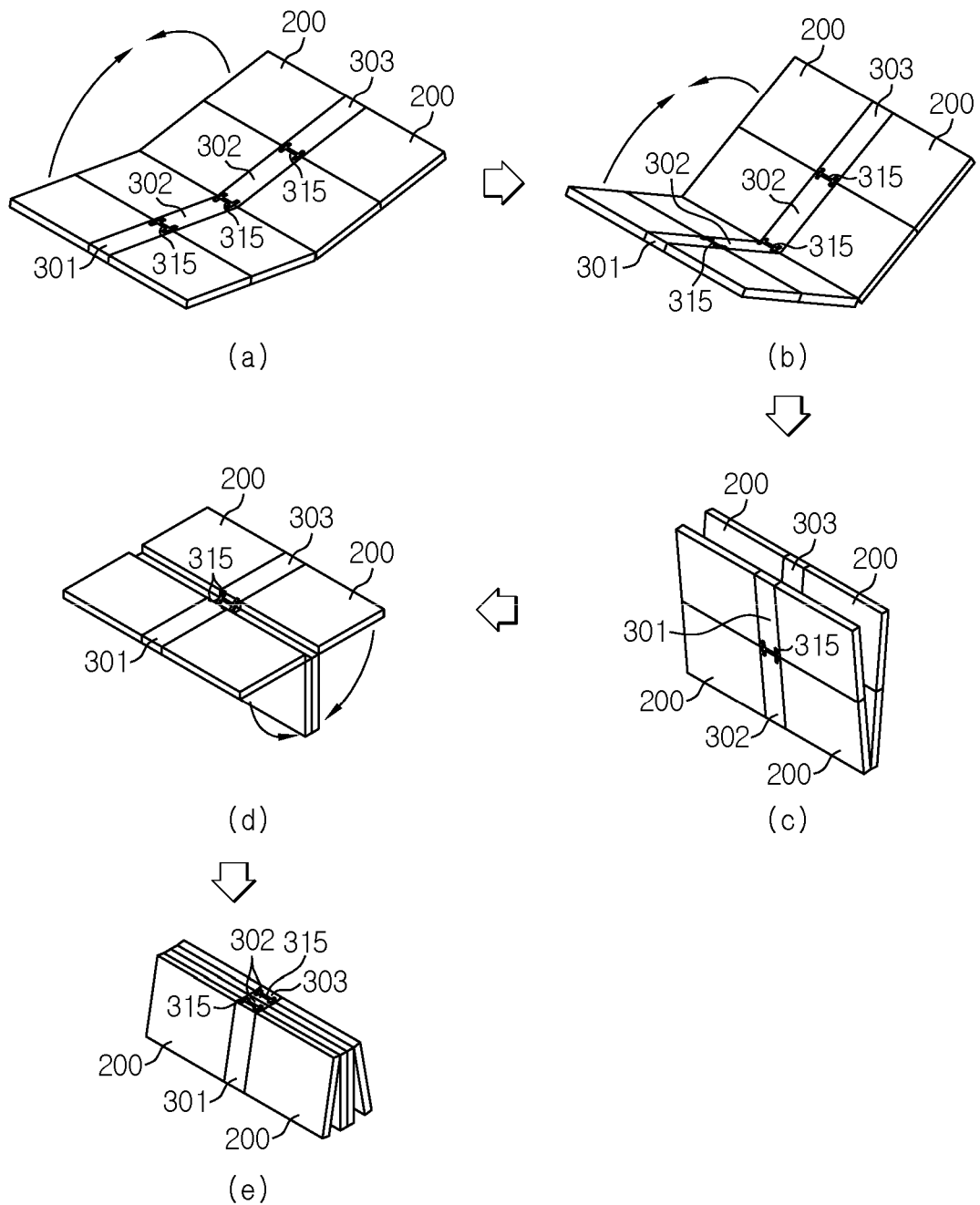
FIG. 16 is a diagram illustrating the step of stacking unit cells in a hinged manner in a method for fabricating a battery module according to an embodiment of the present disclosure.

Now, when the arranged ICB frames 310 are folded up in a zigzag fashion with respect to the hinge part or the joint element 315, the unit cells 200 are stacked in a hinged structure. For example, folding may be performed by a method shown in FIG. 16. FIG. 16 is a diagram illustrating the step of stacking the unit cells in a hinged manner in the method for fabricating a battery module according to the present disclosure.

Figure 17:
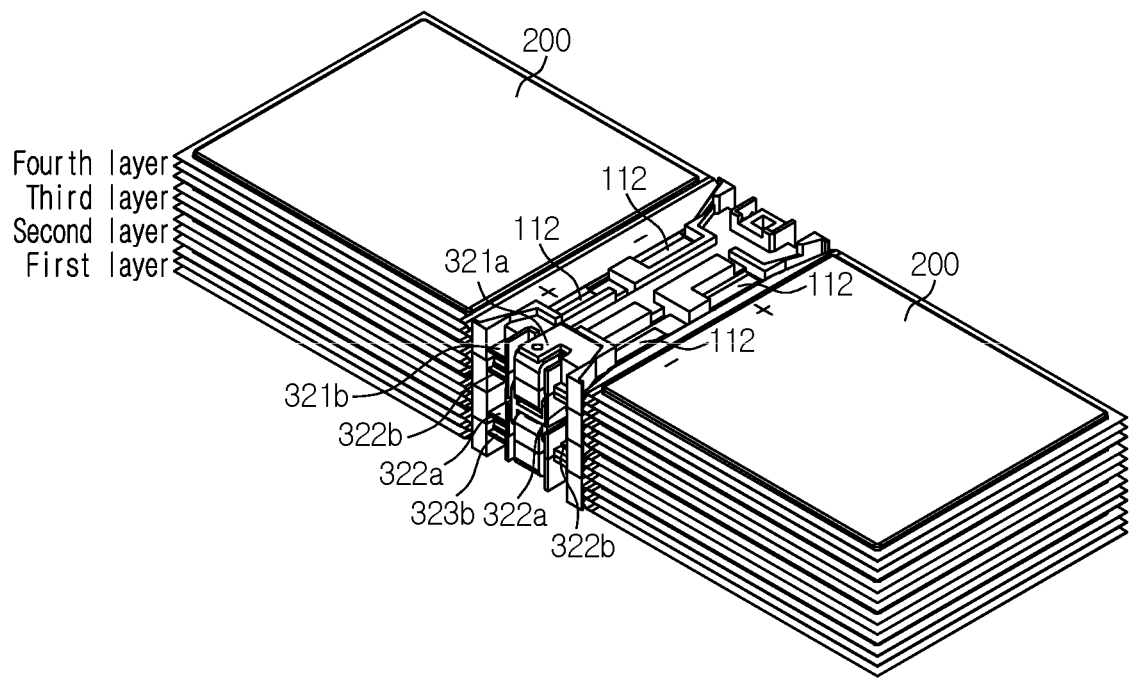
FIG. 17 is a perspective view of unit cells stacked by the method of FIG. 16.

Referring to FIG. 16, first, as shown in (a), it is folded in half inward from the center. That is, the structure of FIG. 15 is folded in half with respect to the joint element 315 between the two ICB assemblies 302. Subsequently, it is completely folded in the order of (b) and (c) of FIG. 16, and as shown in (d), the outermost unit cell 200 is folded down outward. That is, it is folded with respect to the joint element 315 between the ICB assembly 301 and the ICB assembly 302 and the joint element 315 between the ICB assembly 302 and the ICB assembly 303. Then, as shown in (e), it may be folded and stacked in an inverted W shape, and finally, as shown in FIG. 17, it may be folded with a structure in which a total of four layers, first to fourth layers, are stacked. FIG. 17 shows that the fourth layer in the electrical connection relationship of FIG. 6 is placed on top.

As described above, the method for fabricating a battery module according to the present disclosure includes folding and stacking the unit cells having the cell leads welded with the busbars of the ICB assemblies.

Figure 18:
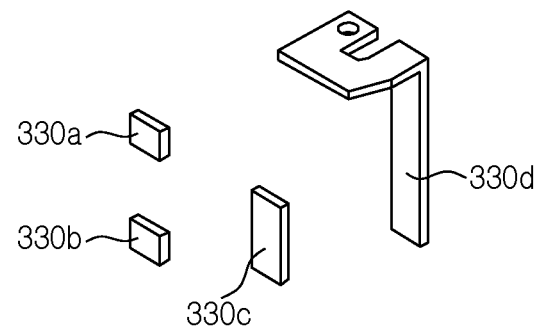
FIG. 18 is a diagram illustrating the step of coupling an additional busbar additionally needed to complete a series connection of unit cells in a method for fabricating a battery module according to an embodiment of the present disclosure.
Figure 18:
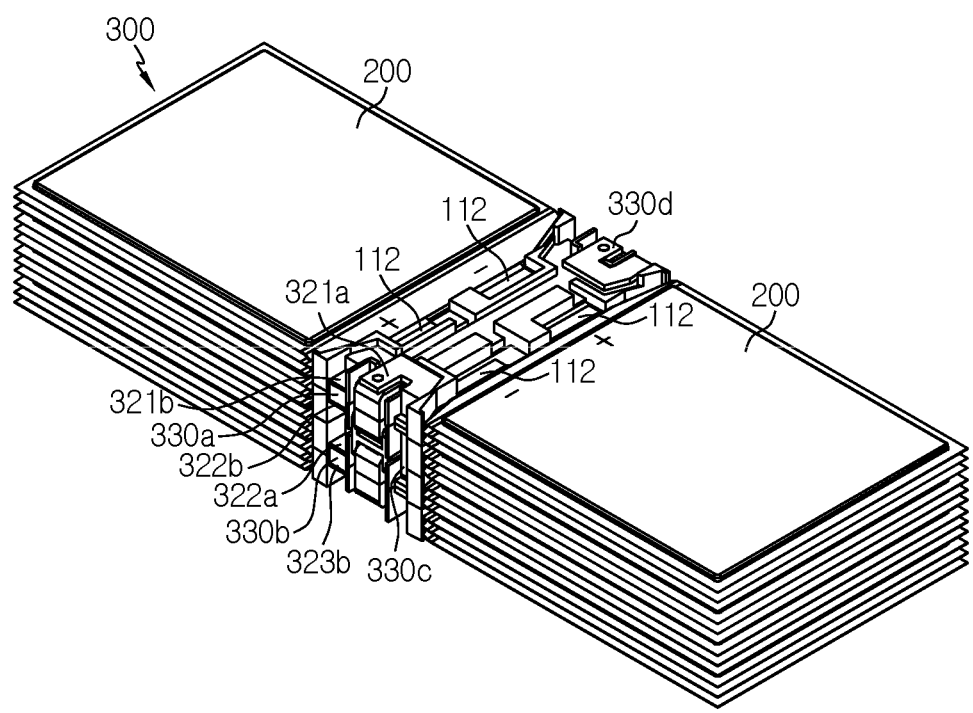

FIG. 18 is a diagram illustrating the step of connecting the unit cells in series, in detail, the vertical series connection (S12), and the step of coupling a separate additional busbar necessary to complete series connection (S13) from bottom to top, in the method for fabricating a battery module according to an embodiment of the present disclosure. In FIG. 18, (a) shows the additional busbar, and (b) shows that the additional busbar of (a) is coupled.

After stacking as shown in FIG. 17, an additional busbar 330a is coupled between the busbars 321b, 322b in the upper and lower layers exposed to the side of the ICB frame 310 (in the shown example, the left side, and the third side 311c of the ICB frame 310). The coupling method may be performed by overlying and welding. Through this, the busbars 321b, 322b are connected to establish a vertical series connection (S12) between the left unit cell 200 in the fourth layer and the left unit cell 200 in the third layer.

Likewise, below there, an additional busbar 330b is coupled between the busbars 322a, 323b in the upper and lower layers exposed to the side. The busbars 322a, 323b are connected to each other to establish a vertical series connection between (S12) between the left unit cell 200 in the second layer and the left unit cell 200 in the first layer.

Likewise, next to that, an additional busbar 330c is coupled between the busbars 322a, 322b in the upper and lower layers exposed to the side. The busbars 322a, 322b are connected to each other to establish a vertical series connection (S12) between the right unit cell 200 in the third layer and the right unit cell 200 in the second layer.

As described above, when the additional busbars 330a, 330b, 330c are coupled by placing them on the side and welding, vertical series connection (S12) is all established, and the unit cells 200 placed side by side along the arrangement direction of the ICB frames 310 in the structure of FIG. 16 and the stacked unit cells 200 placed in upper and lower positions in the structure of FIG. 17 are connected to each other.

The busbar 323a (not seen in the drawing due to its location) on the bottom is exposed to the other surface of the ICB frame 310 (in the shown example, the right side, and the fourth side 311d of the ICB frame 310). An additional busbar 330d is coupled thereto. Then, "S13" of FIG. 6 is established.

The shape and number of the additional busbars 330a, 330b, 330c, 330d may differ depending on series/parallel connection structure. In this embodiment, three additional busbars 330a, 330b, 330c of a simple rectangular shape as shown in FIG. 18 connect the unit cells 200 of neighboring upper and lower layers in stacked state. The additional busbar 330a connects the unit cells 200 in the fourth layer and the third layer. The additional busbar 330b connects the unit cells 200 in the second layer and the first layer. The additional busbar 330c connects the unit cells 200 in the third layer and the second layer.

One ¬-shaped additional busbar 330d is formed from the first layer to the fourth layer along the side of the battery module 300, one side of the additional busbar 330d is connected to the busbar 323a of the ICB assembly 303 and then the positive cell lead 112 of the right unit cell 200 in the first layer, and the other side of the additional busbar 330d is mounted on the Hv terminal mounting part B12 of the ICB assembly 301 in the fourth layer to form positive Hv (Hv−).

As described above, the method for fabricating a battery module according to the present disclosure includes the step of laterally coupling the additional busbar for vertical series connection (S12) between the unit cells stacked in the heightwise direction from the ground. As described above, the battery module 300 according to an embodiment of the present disclosure as shown in FIG. 18 is completed by coupling the additional busbar. The battery module 300 has an electrical connection relationship as described in FIG. 6, and is fabricated in a simple manner through the fabrication method as described above including preparing ICB assemblies 301, 302, 303, arranging unit cells 200, simultaneously welding, and folding and stacking, without the need for complex connection considering the polarity of cell leads. As described above, according to an embodiment of the present disclosure, the battery module of horizontal stack structure including eight 3P bank unit cells 200 all connected in series to establish 3P8S electrical connection is fabricated by a very simple method.

As described above, in the fabrication of the battery module in which unidirectional battery cells are horizontally stacked, facing each other, as opposed to the conventional method including stacking two battery cells, facing each other, performing welding between cell leads, stacking two battery cells thereon, facing each other, performing welding between cell leads, and stacking two battery cells thereon, facing each other and performing welding between cell leads, the present disclosure does not need to repeat stacking and welding in a sequential order. It is possible to fabricate the battery module in a simple manner by arranging the battery cells horizontally, simultaneously welding on the top side, folding and stacking, and coupling the additional busbar on the side to vertically connect the stacked battery cells to each other.

As hereinabove described in detail, the present disclosure proposes an ICB assembly of a new structure for performing the method for fabricating a battery module. The ICB assembly includes an ICB frame of the same shape and busbars of many shapes in various combinations, and is a new component that can be connected to other ICB assembly through a hinge connection structure, so that when the ICB assembly is folded with respect to the connected part, the battery cells connected to the ICB assembly may be stacked. That is, the ICB assembly of the present disclosure is a component that may be folded and stacked in a hinge connection structure and allows changing various busbars to realize various electrical connection relationships.

As described above, option 1 structure described in the embodiment of the present disclosure is implemented into the battery module 300 as shown in FIG. 18, and may be fabricated by preparing a total of four ICB assemblies of three types including type 1 ICB frame and busbars of many different shapes such as a Hv terminal busbar, a connecting busbar, a through busbar and a Hv extended busbar, horizontally arranging the unit cells using the ICB assemblies, welding the busbars and the cell leads of the unit cells together on the top side, folding and stacking, and coupling an additional busbar on the side for vertical series connection of the stacked unit cells.

The battery module 300 includes two unit cells 200 connected in the horizontal direction through the ICB assembly 303, two unit cells 200 connected in the horizontal direction through the ICB assembly 302, and unit cells 200 connected in the horizontal direction through the ICB assembly 301, stacked in the heightwise direction from the ground, and Hv terminals [positive Hv (Hv+) and negative Hv (Hv−)] on top of the battery module 300. The ICB assemblies 301, 302, 303 are connected with the joint element 315, additional busbars 330a, 330b, 330c for vertical series connection of the unit cells 200 are coupled to the side of the ICB assemblies 301, 302, 303, and an additional busbar 330d for series connection from bottom to top is also coupled to the other side of the ICB assemblies 301, 302, 303. The two unit cells 200 facing each other on the plane are horizontally connected in series via the through busbars 321c, 322c. 323c assembled respectively in the ICB assemblies 301, 302, 303, and the unit cells 200 stacked in the heightwise direction from the ground are vertically connected in series through the additional busbars 330a, 330b, 330c. The ICB assemblies 301, 302, 303 are multiple types of ICB assemblies in which the ICB frames 310 have the same shape and the busbars 321a, 321b, 321c. 322a, 322b, 322c. 323a, 323b, 323c are differently applied.

As described above, using the ICB assembly of the present disclosure, the battery module is fabricated by horizontally arranging battery cells, simultaneously welding, and folding and stacking. Particularly, the ICB assembly realizes the simplest connection relationship among a large number of possible electrical connections between a plurality of battery cells. According to the method for fabricating a battery module in accordance with the present disclosure using this, it is possible to greatly simplify the fabrication step of the battery module in which the unidirectional battery cells are horizontally stacked such that the unidirectional battery cells face each other.

The battery module of the present disclosure includes the ICB assembly of the present disclosure, and thus is very easy to assemble. Additionally, it is possible to expand the battery module by increasing the number of battery cells connected in series through a simple process of additionally including a unit of battery cell—ICB assembly—battery cell. That is, the battery module of the present disclosure is fabricated by stacking the units of battery cell—the ICB assembly—battery cell in the heightwise direction from the ground such that the battery units facing each other with respect to the ICB assembly are connected to each other, and thus it is possible to expand the battery module by increasing the number of units of battery cell—ICB assembly—battery cell.

According to the present disclosure, there is provided an easiest and simplest connection among a large number of possible electrical connection relationships between a plurality of battery cells that make up the battery module. A hinge structure may be applied as a stack guide for stacking the battery cells, and electrical connection between the ICB assemblies may be established by placing the additional busbar on the side of the ICB frame and welding.

Although the above embodiment describes an embodiment in which the battery module 300 is fabricated by applying one ICB frame to every two cell bank unit cells 200 for each of the first to fourth layers, an embodiment in which an ICB frame is provided every two layers and four unit cells 200 are placed on one ICB frame is possible. In this instance, the two unit cells 200 are placed on the upper surface of the ICB frame, and the remaining two unit cells 200 are placed on the lower surface of the ICB frame. As described above, the ICB frame connecting four unit cells 200 is referred to as type 2 ICB frame, to distinguish from the type 1 ICB frame. In the case of the battery module including eight unit cells 200 in total, two type 2 ICB frames in total are necessary. Also here, the ICB frames may be connected side by side in the lengthwise direction, and the ICB frames connected to each other have all the same shape. Here, it is possible to realize various electrical connection relationships by applying busbars of different shapes. For example, the ICB assembly may be made with various configurations by applying various busbars of different shapes to the ICB frame of the same shape, for example, by applying a ⊐ busbar to a certain ICB frame and an S busbar to a different ICB frame, and the battery module may be fabricated using this.

Except the number of unit cells connected to the ICB frame, the unit cells connected to both the upper surface and the lower surface of the ICB frame, and accordingly, inclusion of suitable busbars, i.e., busbars that may be assembled on the upper surface and the lower surface of the ICB frame, and specific electrical connection relationship, all the descriptions of the ICB assembly, the method for fabricating a battery module and the battery module according to the previously described embodiment are equally applied.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. An interconnect board (ICB) assembly, comprising:
an ICB frame configured to receive cell leads of unidirectional battery cells such that the unidirectional battery cells having the cell leads at one end are placed facing each other with the cell leads facing each other; and
busbars assembled in the ICB frame, the busbars sized and configured to be electrically connected to the cell leads,
wherein the ICB frame is a plate type structure having a length and a width, including a cell lead mounting part, a High Voltage (Hv) terminal mounting part and a busbar insertion hole where the cell leads of the battery cells are configured to face each other on two sides with respect to a lengthwise direction center line,
wherein the cell lead mounting part is formed at two places along each of first and second sides of a lengthwise direction of the ICB frame, and includes a first cell lead mounting part and a third cell lead mounting part along the first side and a second cell lead mounting part facing the first cell lead mounting part and a fourth cell lead mounting part facing the third cell lead mounting part along the second side, and the Hv terminal mounting part is formed on each of third and fourth sides in a widthwise direction perpendicular to the first and second sides, and includes a first Hv terminal mounting part on the third side and a second Hv terminal mounting part on the fourth side, and
wherein the busbar insertion hole includes a first busbar insertion hole for insertion of the busbar from the third side into the first cell lead mounting part, a second busbar insertion hole for insertion of the busbar from the third side into the second cell lead mounting part, and a through busbar insertion hole formed through the ICB frame parallel to the widthwise direction for insertion of the busbar placed on both the third and fourth cell lead mounting parts.

2. The ICB assembly according to claim 1, wherein the ICB frame is formed such that at least one of the busbars is of a different shape than another one of the busbars.

3. The ICB assembly according to claim 1, wherein the ICB frame has a plurality of steps and busbar insertion holes to assemble, at any location, at least one of a busbar connected to any one of the cell leads and a busbar connecting a pair of cell leads facing each other among the cell leads.

4. The ICB assembly according to claim 3, wherein the busbars are a combination of busbars selected from a group of busbars having different shapes that are assembled in the ICB frame through the plurality of steps and the busbar insertion holes, considering an electrical connection relationship.

5. The ICB assembly according to claim 1, wherein the busbar is detachably assembled in the cell lead mounting part.

6. The ICB assembly according to claim 1, wherein the busbars include a Hv terminal busbar including a first portion placed on the first Hv terminal mounting part and a second portion placed on the second cell lead mounting part, and
a connecting busbar placed on the first cell lead mounting part, and a through busbar placed on both the third and fourth cell lead mounting parts.

7. The ICB assembly according to claim 6, wherein the Hv terminal busbar is inserted and assembled into the second busbar insertion hole, the connecting busbar is inserted and assembled into the first busbar insertion hole, and the through busbar is inserted and assembled into the through busbar insertion hole.

8. The ICB assembly according to claim 1, wherein the busbars include a connecting busbar placed on the first cell lead mounting part, a different connecting busbar placed on the second cell lead mounting part, and a through busbar placed on both the third and fourth cell lead mounting parts.

9. The ICB assembly according to claim 8, wherein the connecting busbar is inserted and assembled into the first busbar insertion hole, the different connecting busbar is inserted and assembled into the second busbar insertion hole, and the through busbar is inserted and assembled into the through busbar insertion hole.

10. The ICB assembly according to claim 8, wherein the busbar includes a Hv extended busbar including a portion placed on the second Hv terminal mounting part and a portion placed on the first cell lead mounting part, a connecting busbar placed on the second cell lead mounting part, and a through busbar placed on both the third and fourth cell lead mounting parts.

11. The ICB assembly according to claim 10, wherein the Hv extended busbar is placed and assembled in the second Hv terminal mounting part and the first cell lead mounting part, the connecting busbar is inserted and assembled into the second busbar insertion hole, and the through busbar is inserted and assembled into the through busbar insertion hole.

12. The ICB assembly according to claim 1, wherein the ICB frame is a first ICB frame and connected to a second ICB frame via a hinge structure in a lengthwise direction of the first and second ICB frames, and wherein each of the first and second ICB frames has a rod shaped protrusion on sides thereof, and the first and second ICB frames are arranged along the lengthwise direction and connected via a joint element between a respective side of the first and second ICB frames, the joint element having grooves into which the protrusions of the first and second ICB frames are inserted.

13. The ICB assembly according to claim 1, wherein two battery cells are assembled on an upper surface of the ICB frame.

* * * * *